US006230112B1

(12) United States Patent
Ishiyama

(10) Patent No.: US 6,230,112 B1
(45) Date of Patent: May 8, 2001

(54) PNEUMATIC TIRE DESIGNING METHOD

(75) Inventor: Makoto Ishiyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/125,896

(22) PCT Filed: Dec. 26, 1997

(86) PCT No.: PCT/JP97/04882

§ 371 Date: Aug. 27, 1998

§ 102(e) Date: Aug. 27, 1998

(87) PCT Pub. No.: WO98/29269

PCT Pub. Date: Jul. 9, 1998

(30) Foreign Application Priority Data

Dec. 27, 1996  (JP) .................................................. 8-350720

(51) Int. Cl.[7] ...................................................... G06F 17/50
(52) U.S. Cl. ................................. 703/1; 703/6; 152/450; 152/454
(58) Field of Search ........................ 395/500.27, 500.28, 395/500.29, 500.23; 152/450, 454, 209.24, 209.28; 702/183, 33; 703/1, 2, 6, 8

(56) References Cited

U.S. PATENT DOCUMENTS

| 1,956,011 | 4/1934 | Evans ................................. | 152/209.3 |
| 3,023,798 | 3/1962 | Moore et al. ...................... | 152/209.3 |
| 4,690,189 | 9/1987 | Bradisse et al. ................. | 152/209.15 |

(List continued on next page.)

FOREIGN PATENT DOCUMENTS

| 367557 | 5/1990 | (EP) | .................................. | 152/209.3 |
| 591002 | 4/1994 | (EP) | .................................. | 152/209.3 |
| 612631 | 8/1994 | (EP) | .................................. | 152/209.3 |

(List continued on next page.)

OTHER PUBLICATIONS

Akasaka et al.; "Analysis of the Contact Deformation of Tread Blocks", Tire Science and Technology, TSTCA, vol. 20, No. 4, Oct.–Dec., 1992, pp. 260–253.*

(List continued on next page.)

*Primary Examiner*—Kevin J. Teska
*Assistant Examiner*—Douglas W. Sergent
(74) *Attorney, Agent, or Firm*—Sughrue, Mion, Zinn, Macpeak & Seas, PLLC

(57) ABSTRACT

When a single performance or a plurality of antinomical performances are to be obtained, the best mode of a tire is designed under a given condition. A basic shape model using one block as a reference shape is obtained (100). An object function representing a tire performance evaluation physical amount, a constraint condition for restricting the tire shape, and a design variable which is an angle of a wall surface which determines the block shape are determined (102). Next, the design variable is varied continuously by $\Delta r_i$ to determine a modified shape model (104 to 108). A value of the object function of the modified shape model and a value of the constraint condition are calculated, and a sensitivity of the object function and a sensitivity of the constraint condition are determined (110, 112). A variation amount of the design variable which minimizes a standard deviation of block rigidities is estimated, a modified shape model is determined, an object function value is calculated, and a block shape forming the tire is determined by using the value of the design variable (114 to 120).

14 Claims, 21 Drawing Sheets

U.S. PATENT DOCUMENTS

| | | |
|---|---|---|
| 4,777,993 | 10/1988 | Yamashita et al. . |
| 4,815,511 | 3/1989 | Brayer et al. ................... 152/209.15 |
| 5,178,698 | 1/1993 | Shibata . |
| 5,205,879 | 4/1993 | Seitz et al. ........................ 152/209.3 |
| 5,559,729 * | 9/1996 | Abe ........................................... 703/2 |
| 5,617,341 | 4/1997 | Nakajima ........................... 152/209.2 |
| 5,710,718 * | 1/1998 | Kamewaga et al. ...................... 703/1 |
| 5,714,026 | 2/1998 | Wakabayashi .................... 156/110.1 |
| 5,746,849 * | 5/1998 | Hutson et al. ........................ 152/209 |

FOREIGN PATENT DOCUMENTS

| | | | |
|---|---|---|---|
| 688685 | 12/1995 | (EP) | ............................... 152/209.28 |
| 1-549347 | 8/1979 | (GB) | ............................... 152/209.15 |
| 58-50883 | 11/1983 | (JP) . | |
| 62-157810 | 7/1987 | (JP) . | |
| 63-23925 | 5/1988 | (JP) . | |
| 1-195103 | 8/1989 | (JP) . | |
| 2-109705 | 4/1990 | (JP) | ................................. 152/209.3 |
| 2-127103 | 5/1990 | (JP) . | |
| 2-141310 | 5/1990 | (JP) | ............................... 152/209.15 |
| 2-147414 | 6/1990 | (JP) . | |
| 3-92403 | 4/1991 | (JP) . | |
| 4-232105 | 8/1992 | (JP) . | |
| 6-143940 | 5/1994 | (JP) . | |
| WO 94/16877 | 8/1994 | (JP) . | |
| 7-52610 | 2/1995 | (JP) . | |
| 7-149114 | 6/1995 | (JP) . | |
| 7-164815 | 6/1995 | (JP) . | |
| 7-186623 | 7/1995 | (JP) . | |

OTHER PUBLICATIONS

Walters, M. H.; "Uneven Wear of Vehicle Tires", Tire Science and Technology, TSTCA, vol. 21, No. 4, Oct.–Dec. 1993, pp. 202–219.*

Murakoshi et al.; "An Approach to Vehicle Pull Using a Tire Finite Element Model", Tire Science and Technology, TSTCA, vol. 20, No. 4, Oct.–Dec., 1992, pp. 212–229.*

Danielson et al.; "Computational Strategies for Tire Modeling and Analysis", Computer & Structures, vol. 61, Issue 4, Nov. 1996, pp. 673–693.*

* cited by examiner

FIG. 21
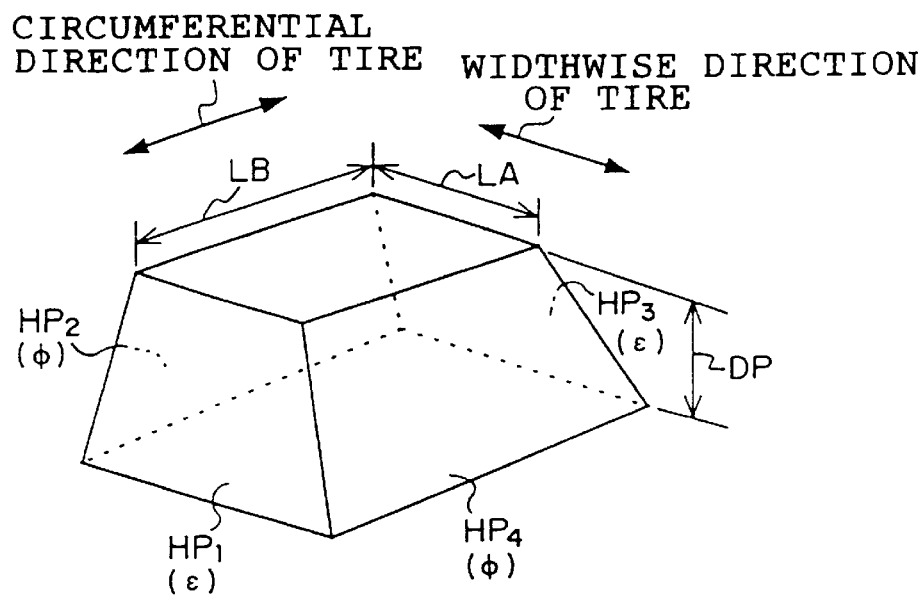
FIG. 22A
FIG. 22B
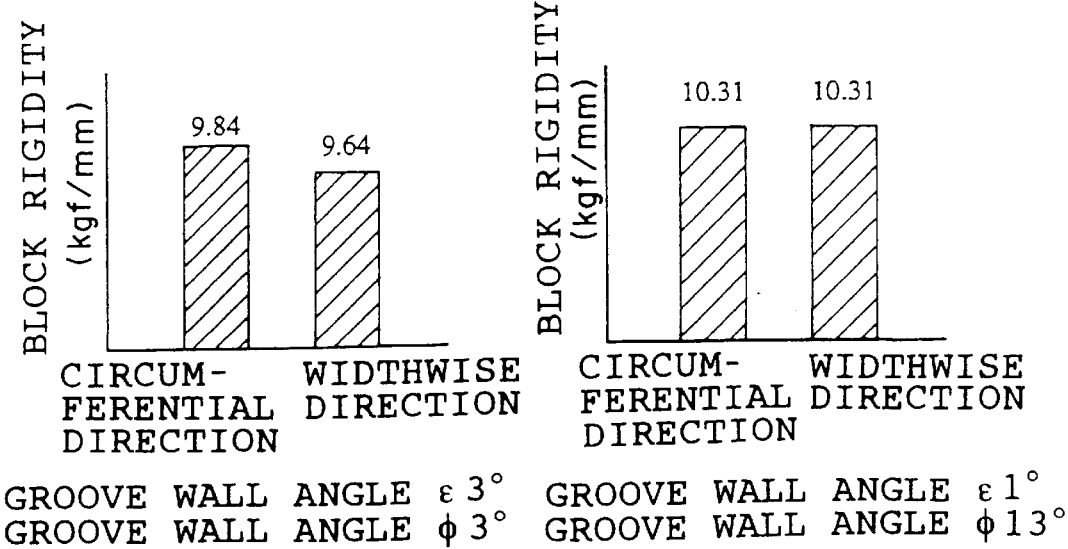

FIG. 23A
FIG. 23B
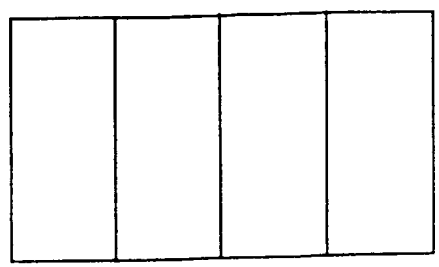
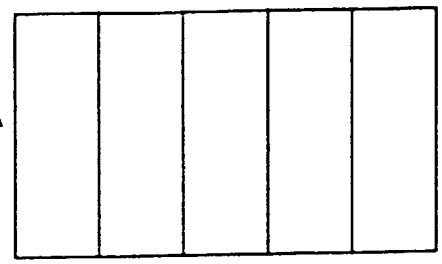
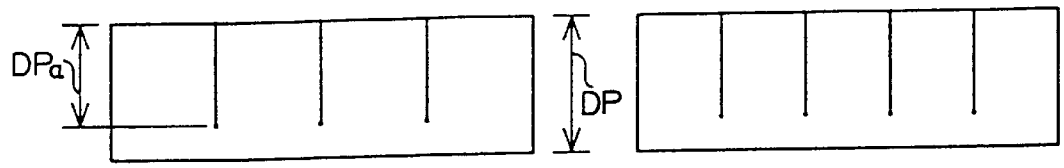
FIG. 24
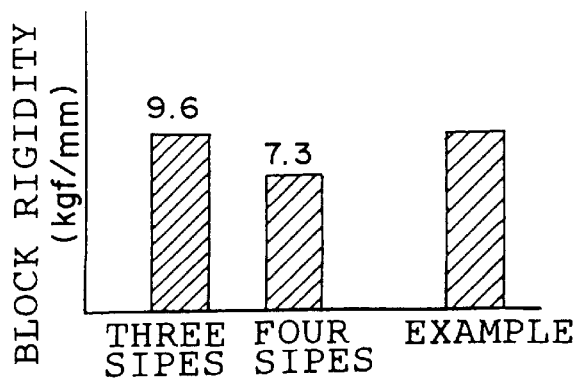

PNEUMATIC TIRE DESIGNING METHOD

TECHNICAL FIELD

The present invention relates to a method for designing a pneumatic tire, and more particularly, to a method for designing a pneumatic tire capable of efficiently and easily designing the development of a design such as the tire structure, shape, and the like which achieve a single object performance, antinomical performances, and the like.

BACKGROUND ART

Conventional methods for designing tires are based on empirical rules achieved by a repetition of numerical experiments using actual experimentation and computers. Therefore, the number of trials and tests required for development is extremely large, which increases development costs, and the development time period cannot be shortened easily.

For example, the shape of the crown portion of a tire is designed on the basis of several arcs in a cross-sectional configuration including a rotational axis of the tire. A value of an arc is determined from data obtained by preparing several molds and testing and evaluating tires prepared from the molds, or is determined by conducting many numerical experiments. Therefore, the development efficiency is not good.

Further, pattern design has many degrees of freedom. Therefore, after grooving a proposed basic pattern in a tire or after actually preparing a mold, a trial tire is made and tested on a vehicle and evaluated. Problems arising at the vehicle are overcome by finely modifying the proposed basic pattern, so as to complete a final pattern. Thus, pattern design is in a field requiring the most processes, as compared with the designing of tire shape and structure.

A pneumatic tire is generally formed with rib grooves in a circumferential direction of the tire and lug grooves in a radial direction of the tire, so as to prevent the hydroplaning phenomenon which occurs during vehicle running in rain, and so as to ensure braking performance and traction performance. A general pattern is a so-called block pattern which includes island shaped land portions surrounded by these rib grooves and lug grooves.

Such a block pattern requires running performances of the tire, in general, both a straight running performance and a cornering performance. The straight running performance requires a grip force in a circumferential direction of the tire, and a relatively hard rubber is suitable. On the other hand, the cornering performance requires a grip force in a widthwise direction of the tire, and a relatively soft rubber is suitable to increase the grip force during cornering. Due to the soft rubber, there is need to increase energy loss, which is antinomical.

For this reason, in order to obtain a plurality of antinomical performances, there has been proposed a so-called widthwisely divided tread in which the tread is divided in a widthwise direction, a soft tread rubber is used in regions in the vicinities of both ends of the tread which contribute greatly to cornering, and a hard tread rubber is used in a center region of the tread which contributes greatly to straight running (Japanese Patent Application Publication Nos. 58-50883 and 63-23925).

However, a tire provided with the widthwisely divided tread as in the conventional art is inferior in productivity, and has a problem that irregular wear or separation occurs at a boundary surface of the division.

Further, in many cases, a block shape of the ground-contacting surface of the tire tread portion is determined so as to prevent the hydroplaning phenomenon, or is determined by requirements in terms of braking performance, traction performance, and design which is fit for aesthetic appearance, and therefore, the degrees of freedom in design are largely limited.

In view of the above circumstances, it is an object of the present invention to provide a method for designing a pneumatic tire, in which when a single performance or a plurality of antinomical performances are to be obtained, the best mode of a tire is designed under a given constraint conditions, and in which the tire can be efficiently designed and developed.

DISCLOSURE OF THE INVENTION

To achieve the above object, according to claim 1, there is provided a method for designing a pneumatic tire including the steps of: (a) determining: a basic shape model representing one shape selected from a shape of a block including an internal structure, a shape of a pattern of a portion of a tire crown portion including an internal structure, and a shape of a land portion which is continuous in a tire circumferential direction including an internal structure; an object function representing a tire performance evaluation physical characteristic; a design variable for determining the shape of the block, the shape of the pattern or the shape of the land portion; and a constraint condition for constraining at least one of a tire cross-sectional configuration, the tire performance evaluation physical characteristic, and the one shape selected from the shape of the block, the shape of the pattern and the shape of the land portion; (b) determining a value of the design variable by calculating while varying the value of the design variable until the optimal value of the object function is obtained, while taking the constraint condition into account; and (c) designing a tire based on the design variable which provides the optimal value of the object function.

According to claim 2, there is provided a method for designing a pneumatic tire according to claim 1, wherein in the step (b), a variation amount of the design variable which provides the optimal value of the object function is estimated while taking the constraint condition into account and on the basis of a sensitivity of the object function, which is a ratio of a unit variation amount of the design variable to a variation amount of the object function, and on the basis of a sensitivity of the constraint condition, which is a ratio of a unit variation amount of the design variable to a variation amount of the constraint condition; a value of the object function when the design variable is varied by an amount corresponding to the estimated amount is calculated and a value of the constraint condition when the design variable is varied by the amount corresponding to the estimated amount is calculated; and a value of the design variable which provides the optimal value of the object function is determined on the basis of the estimated value and the calculated values while taking the constraint condition into account.

According to claim 3, there is provided a method for designing a pneumatic tire according to claim 1, wherein in the step (a), a selection group including a plurality of basic shape models representing one shape selected from the shape of the block including the internal structure, the shape of the pattern of a portion of a tire crown portion including the internal structure, and the shape of the land portion which is continuous in a tire circumferential direction including the internal structure is determined; and the object function, the design variable, the constraint condition, and an adaptive function which can be evaluated from the object function and the constraint condition are determined for each basic shape model of the selection group; and in the step (b), two basic shape models are selected from the selection group on the basis of the adaptive function; the design variables of the two basic shape models are crossed at a predetermined probability to create a new basic shape model and/or a portion of the design variable of at least one of the two basic shape models is varied to create a new basic shape model; an object function, a constraint condition and an adaptive function of the basic shape model whose design variable has been varied are determined, the basic shape model whose design variable has been varied and a basic shape model whose design variable has not been varied are stored, the above operations are repeated until the number of stored basic shape models reaches a predetermined number, it is determined whether a new group including the predetermined number of the stored basic shape models satisfies a convergence condition, and when the convergence condition is not satisfied, the above operations are repeated, by using the new group as the selection group, until the selection group satisfies the convergence condition, and when the convergence condition is satisfied, a value of the design variable which provides the optimal value of the object function is determined among the predetermined number of the stored basic shape models while taking the constraint condition into account.

According to claim 4, there is provided a method for designing a pneumatic tire according to any one of claims 1 to 3, wherein the design variable includes a variable which represents at least one of: an angle of a surface connected to a surface of the tire land portion which is formed by one shape selected from the shape of the block, the shape of the pattern and the shape of the land portion; a height up to the surface of the tire land portion; a shape of the surface of the tire land portion; a shape of a surface connected to the surface of the tire land portion; a position of a sipe; the number of sipes; a width of a sipe; a depth of a sipe; an inclination of a sipe; a shape of a sipe; and a length of a sipe.

Step (a) in claim 1 determines: a basic shape model representing one shape selected from a shape of a block alone including an internal structure, a shape of a pattern of a portion of a tire crown portion including an internal structure, and a shape of a land portion which is continuous in a tire circumferential direction including an internal structure; an object function representing a tire performance evaluation physical characteristic; a design variable for determining the shape of the block, the shape of the pattern or the shape of the land portion; and a constraint condition for constraining at least one of a tire cross-sectional configuration, the tire performance evaluation physical characteristic, and the one shape selected from the shape of the block, the shape of the pattern and the shape of the land portion.

The basic shape model representing the shape of the block can be formed from a function representing a line which specifies the outer surface shape of the block or from a variable representing a coordinate value of an inflection point. The basic shape model representing the pattern shape of a portion of the tire crown portion including the internal structure can be formed from a function which can geometrically analyze the shape of the pattern on the ground-contacting side of one land portion of the tire crown portion, e.g., can be formed from a function for determining a polygonal shape such as a rectangular shape or a rhombus shape. The basic shape model representing the shape of the land portion which is continuous in the tire circumferential direction including the internal structure can be formed from a function representing a line expressing the tire cross-sectional configuration or from a variable representing a coordinate value of an inflection point.

Each basic shape model may include at least one of: an angle of a surface connected to a surface of the tire land portion which is formed by one shape selected from the shape of the pattern and the shape of the land portion; a height up to the surface of the tire land portion; a shape of the surface of the tire land portion; a shape of a surface connected to the surface of the tire land portion; a position of a sipe; the number of sipes; a width of a sipe; an inclination of a sipe; a shape of a sipe; and a length of a sipe. Further, as the basic shape model, a model formed by a technique called the finite element method which performs a division into a plurality of elements, or a model formed by an analytical technique can be utilized.

As the object function representing the performance evaluation physical characteristic, a physical characteristic which influences the running performance of the tire such as block rigidity can be used. As the design variable which determines the shape of the block alone or the shape of the pattern or the shape of the land portion, as described in claim 4, a variable can be used which represents at least one of: an angle of a surface connected to a surface of the tire land portion which is formed by the one shape selected from the shape of the block, the shape of the pattern and the shape of the land portion (i.e., an angle of a block groove wall in the case that a block is used); a height up to the surface of the tire land portion (i.e., the depth of a groove if the groove is formed); a shape of the surface of the tire land portion; a shape of a surface connected to the surface of the tire land portion; a position of a sipe; the number of sipes; a width of a sipe; a depth of a sipe; an inclination of a sipe; a shape of a sipe; and a length of a sipe. As the constraint condition, there are constraints such as a constraint of tread thickness, a constraint of block rigidity, a constraint of an angle of a side surface of the land portion formed on the tire (e.g., an angle of a block groove wall in the case that a block is used), or the like. The object function, the design variable and the constraint condition are not limited to those described above, and various elements can be used as the object function, the design variable and the constraint condition in accordance with the purpose of the tire design.

In next step (b), the value of the design variable is determined by calculation while varying the value of the design variable until the optimal value of the object function is obtained, while taking the constraint condition into consideration. In this case, as described in claim 2, it is effective that a variation amount of the design variable which provides the optimal value of the object function is estimated while taking the constraint condition into account and on the basis of a sensitivity of the object function, which is a ratio of a unit variation amount of the design variable to a variation amount of the object function, and on the basis of a sensitivity of the constraint condition, which is a ratio of a unit variation amount of the design variable to a variation amount of the constraint condition; a value of the object function when the design variable is varied by an amount corresponding to the estimated amount is calculated and a value of the constraint condition when the design variable is varied by an amount corresponding to the estimated amount is calculated; and a value of the design variable which provides the optimal value of the object function is determined on the basis of the estimated value and the calculated values while taking the constraint condition into account. As a result, a value of the design variable such that the value of the object function becomes optimal while taking the constraint condition into account can be determined.

In step (c), the tire is designed by changing the basic shape model on the basis of the design variable which provides the optimal value of the object function.

In claim 3, in the above-described step (a), a selection group including a plurality of the basic shape models representing one shape selected from the shape of the block including the internal structure, the shape of the pattern of a portion of a tire crown portion including the internal structure, and the shape of the land portion which is continuous in a tire circumferential direction including the internal structure is determined; and the object function, the design variable, the constraint condition, and an adaptive function which can be evaluated from an object function and a constraint condition are determined for each of the basic shape models of the selection group.

Next, in the step (b), two basic shape models are selected from the selection group on the basis of the adaptive function; the design variables of the two basic shape models are crossed at a predetermined probability to create a new basic shape model, and/or a portion of the design variable of at least one of the two basic shape models is varied to create a new basic shape model; an object function, a constraint condition and an adaptive function of the basic shape model whose design variable has been varied are determined, the basic shape model whose design variable has been varied and a basic shape model whose design variable has not been varied are stored, the above operations are repeated until the number of stored basic shape models reaches a predetermined number, it is determined whether a new group including the predetermined number of the stored basic shape models satisfies a convergence condition, and when the convergence condition is not satisfied, the above operations are repeated, by using the new group as the selection group, until the selection group satisfies the convergence condition, and when the convergence condition is satisfied, a value of the design variable which provides the optimal value of the object function is determined from the predetermined number of the stored basic shape models while taking the constraint condition into account. The tire is designed by changing the basic shape model in step (c) on the basis of the value of the design variable which provides the optimal value of the object function.

In this case, in step (b), it is further effective that a variation amount of the design variable which provides the optimal value of the object function is estimated while taking the constraint condition into account and on the basis of the sensitivity of the object function, which is a ratio of a unit variation amount of the design variable to a variation amount of the object function, and on the basis of the sensitivity of the constraint condition, which is a ratio of a unit variation amount of the design variable to a variation amount of the constraint condition; a value of the object function when the design variable is varied by an amount corresponding to the estimated amount is calculated and a value of the constraint condition when the design variable is varied by an amount corresponding to the estimated amount is calculated; the adaptive function is determined from the value of the object function and the value of the constraint condition, the basic shape model whose design variable has been varied and the basic shape model whose design variable has not been varied are stored, and the above operations are repeated until the number of the stored basic shape models reaches a predetermined number. In accordance with this method as well, it is possible to determine the value of the design variable such that the value of the object function becomes optimal while taking the constraint condition into account. As the adaptive function which can be evaluated from the object function and the constraint condition, a function for determining fitness with respect to the basic shape model from the object function and the constraint condition can be used. Further, the object function, the design variable, the constraint condition and the adaptive function are not limited to the above examples, and various conditions and feature can be set in accordance with the purpose of tire design. Further, for crossing the design variables of the basic shape models, there is a method in which portions of the design variables of the selected two shape models or predetermined regions and the following portions of the design variables are exchanged. Furthermore, for changing a portion of the design variable of the basic shape model, there is a method in which the design variable at a position which is determined in advance by probability or the like is changed (mutated).

As described above, according to the present invention, a design variable which provides the optimal value of the object function taking the constraint condition into account is determined, and from this design variable, a tire can be designed by using a block shape or a pattern or the like. Therefore, unlike the conventional design and development which are based on trial and error, it is possible, to some extent, that operations from designing of the best mode to evaluation of tire performance can be done mainly by using computer computation. Efficiency can be remarkably enhanced, the cost of development is reduced, and the block shape and the pattern forming the tire can be designed in accordance with the purpose of use.

BRIEF DESCRIPTION OF THE DRAWINGS

FIG. 21 is a diagram showing a block shape according to a first example.

FIG. 22A shows a relationship of block rigidity in the circumferential direction and widthwise direction of the first example, and FIG. 22B shows the relationship after optimization.

FIG. 23A is a diagram showing shapes of blocks of three sipes according to a second example, and FIG. 23B is a diagram showing shapes of blocks of four sipes.

FIG. 24 is a diagram showing a relationship between circumferential direction block rigidity and widthwise direction block rigidity according to the second example.

BEST MODE FOR CARRYING OUT THE INVENTION

One example of modes for carrying out the present invention will be described in detail below with reference to the drawings.

Figure 1:
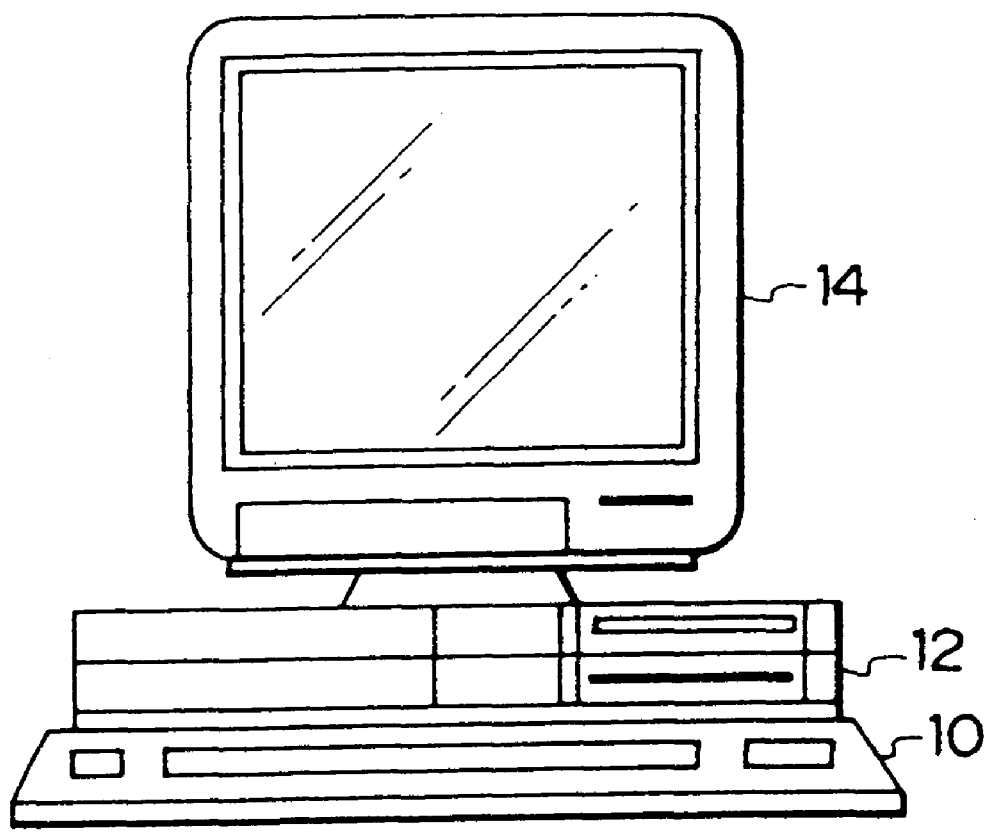
FIG. 1 is a schematic view of a personal computer used in embodiments of the present invention.

FIG. 1 schematically illustrates a personal computer for carrying out a method of designing a pneumatic tire of the present invention.

The personal computer comprises a keyboard 10 for inputting data and the like, a computer main body 12 for calculating design variables for satisfying constraint conditions, and for optimizing, i.e., maximizing or minimizing, an object function, in accordance with a program stored in advance. The personal computer further comprises a CRT 4 displaying calculation results of the computer main body 12 and the like.

[First Embodiment]

Next, a first embodiment, which designs a block shape in which the block rigidities are made uniform in all directions in order to enhance the irregular wear resistance and the steering stability, will be described.

Figure 2:
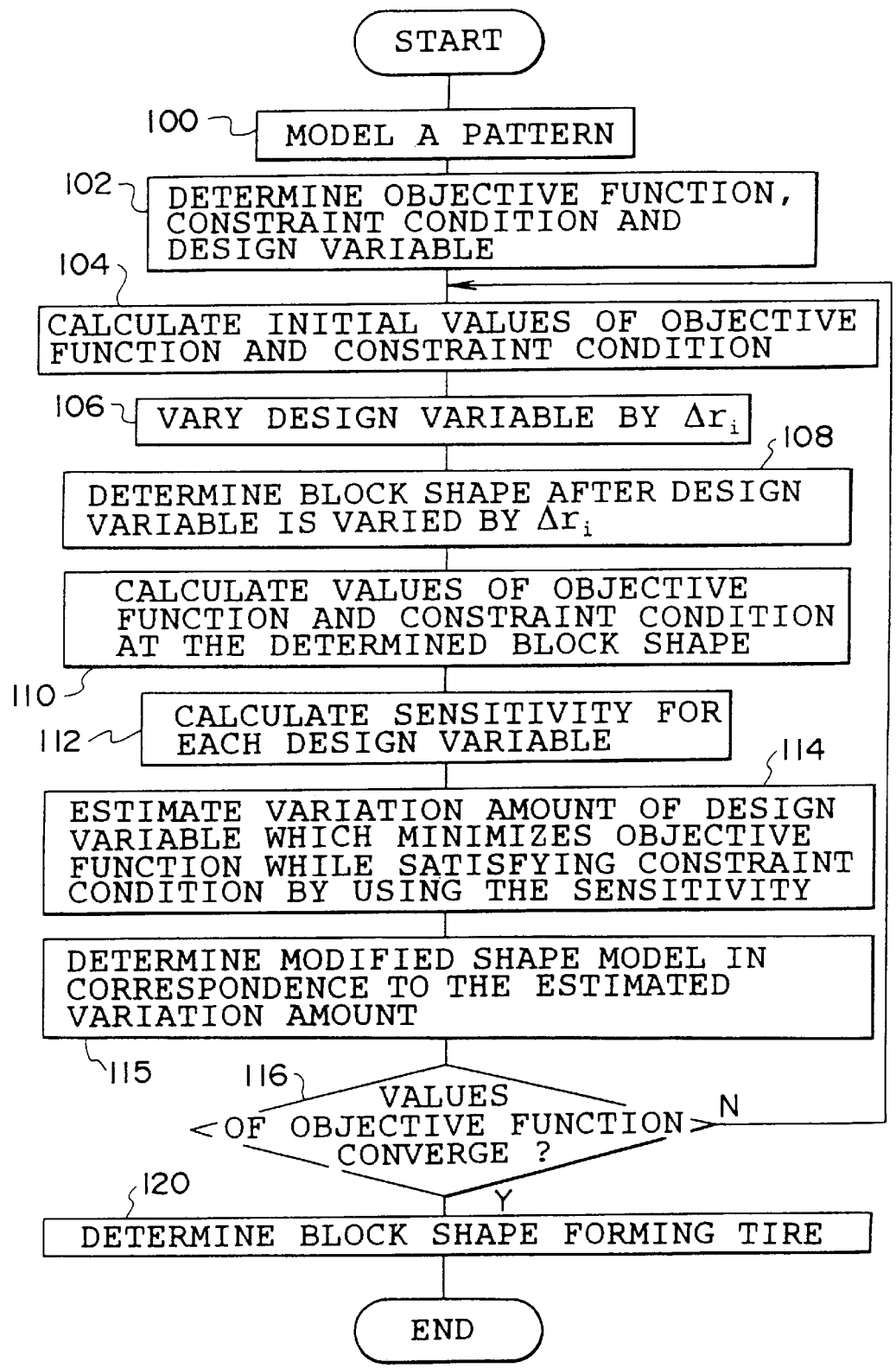
FIG. 2 is a flowchart showing a flow of a shape design processing routine according to a first embodiment of the present invention.

FIG. 2 shows a processing routine of a program according to the first embodiment. In step 100 in FIG. 2, with the shape of one block of a tire being used as a reference shape, the reference shape is modeled by a technique which can numerically and analytically obtain the block rigidity, such as the finite element method. A tire shape including an internal structure is expressed, and a basic shape model divided into a plurality of elements by mesh division is obtained. The reference shape is not limited to the shape of one block of a tire, and may be an arbitrary shape. Here, the term "is modeled" means to convert the tire shape, structure, material and pattern into numerical values in data style for inputting into a computer program which has been prepared based on a numerical and analytical technique.

Figure 4:
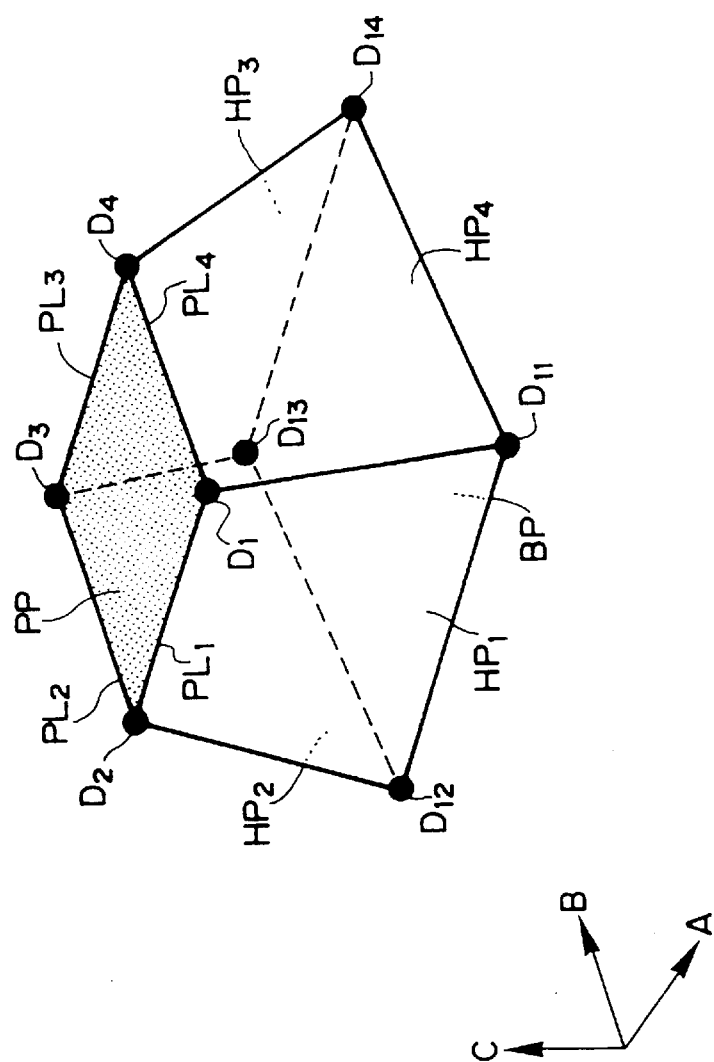
FIG. 4 is a diagram showing a basic shape model.

FIG. 4 shows one example of a basic shape model of one block. The block is determined by eight points $D_1$, $D_2$, $D_3$, $D_4$, $D_{11}$, $D_{12}$, $D_{13}$ and $D_{14}$. In FIG. 4, arrow A indicates a tire circumferential direction, arrow B indicates a tire widthwise direction and arrow C indicates a tire radial direction. Further, PP indicates a ground-contact surface of one block, $PL_1$, $PL_2$, $PL_3$ and $PL_4$ indicate lines expressing the ground-contact surface shape, and $D_1$, $D_2$, $D_3$ and $D_4$ indicate vertices of the ground-contact surface which are points of intersection of the lines expressing the ground-contact surface shape. In this model, since the ground-contact surface PP is square, wall surfaces $HP_1$, $HP_2$, $HP_3$ and $HP_4$ are connected to the ground-contact surface PP. A bottom surface BP is formed substantially parallel to the ground-contact surface PP, and bottom points $D_{11}$, $D_{12}$, $D_{13}$ and $DL_{14}$ are formed by the wall surfaces and the bottom surface.

It is also possible for the distance between the wall surface and the bottom surface to correspond to the so-called groove depth. The basic shape model can be divided into a plurality of elements, and may be divided into a plurality of elements by a plurality of normal lines of the tire surface, and may be divided into arbitrary shapes such as triangles depending upon the purpose of design.

In next step 102, an object function representing a physical characteristic for evaluating a performance of the tire, as well as a tire shape and a constraint condition for limiting the tire shape are determined. That is, a design variable which determines the block shape is determined. In the present embodiment, in order to enhance the steering stability and the irregular wear resistance, the object function OBJ and the constraint condition G are determined as follows:

Object function OBJ: Block rigidities are made uniform in all directions.

Constraint condition G: Tread thickness limiting the tire shape is made uniform.

The block rigidities in all directions, which is determined as the object function, can be obtained by determining the position of the block provided on the tire, and determining the rigidity for each predetermined angle from the rigidity in the tire circumferential direction to the rigidity in the tire widthwise direction by using known equations of rigidity. For example, there are rigidities in each of the circumferential direction, widthwise direction and oblique direction of a tire. Uniformity in block rigidity in all directions can be calculated from the deviation and these values, e.g., from the average value and the deviation. By determining in advance the range and angular difference of a direction for which rigidity is to be determined, it is possible to design a block having directional property of block rigidity. For example, it is possible to provide blocks with directional property such that circumferential direction rigidity of a block at the center portion of the tire is increased, and widthwise direction rigidity of a block at a side edge portion of the tire is increased.

The tread thickness determined as the constraint condition G can be obtained from the volume except the volume required by blocks when a tire having blocks provided on the tire is formed, i.e., the tread thickness can be determined from the volume of grooves. That is, the flow amount of the material such as rubber in a radial direction of tire is determined in accordance with the volume of the grooves, and the tread thickness can be estimated from this value.

Figure 3:
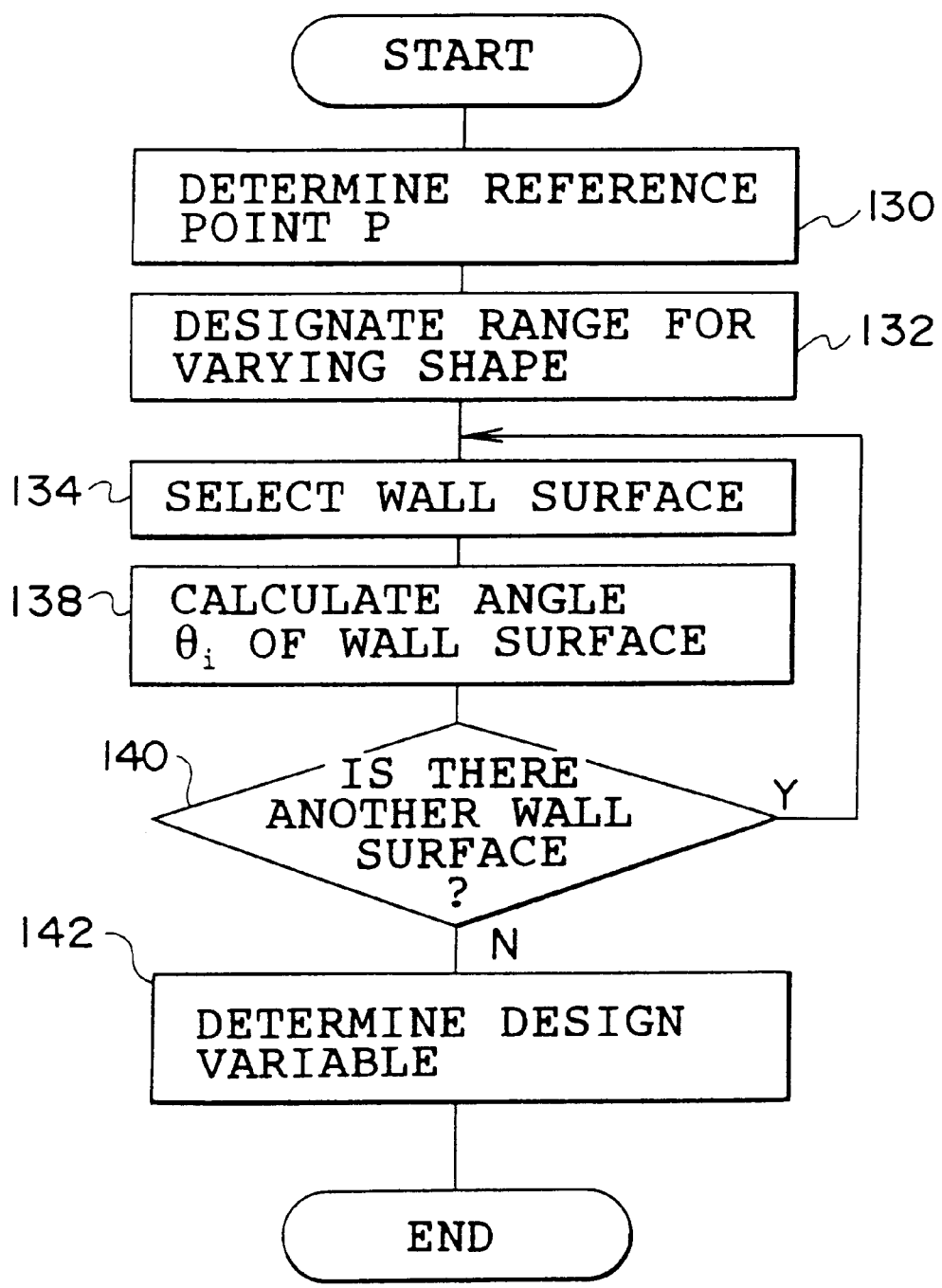
FIG. 3 is a flowchart showing a flow of an angle calculating routine for determining a design variable.
Figure 5:
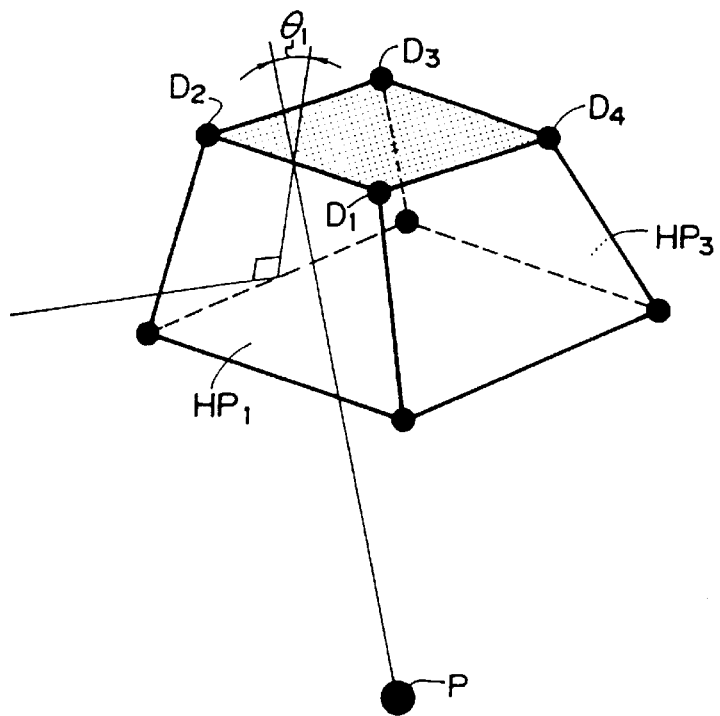
FIG. 5 is a diagram for explaining a wall surface angle.
Figure 6:
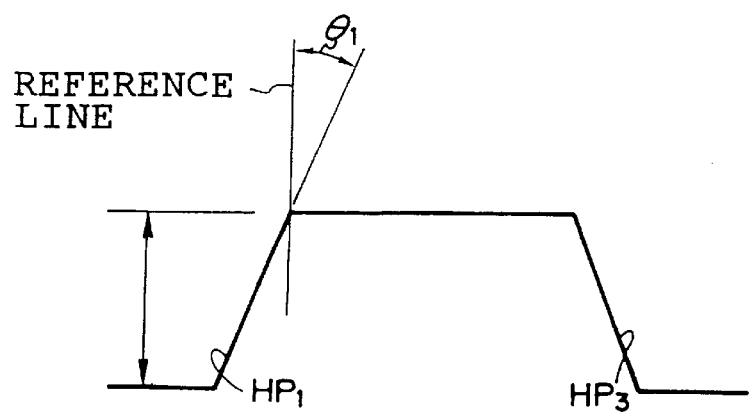
FIG. 6 is a sectional view of FIG. 5.

Further, in the present embodiment, the wall surface angle is used as the design variable, and is set by the angle calculating routine shown in FIG. 3. In step 130 of this angle calculating routine, a reference point P is set at a predetermined point (the center point of the tire, for example) inside of the tire as shown in FIG. 5. In next step 132, a range in which it is possible to incline the wall surface of the block is designated as a range which varies the block shape. In step 134, a wall surface of the block is selected by selecting, from the vertices of the ground-contact surface, one group of points which are adjacent to each other. In the example shown in FIG. 5, the wall surface $HP_1$ is selected by selecting the points $D_1$ and $D_2$. In next step 138, a ridge line of the selected wall surface (in the example of FIG. 5, a straight line passing through the line $PL_1$ from the reference point P), i.e., a straight line in the tire radial direction, is defined as a reference line, and an angle $\theta_1$ defined between the reference line and the selected wall surface $HP_1$ is calculated as shown in FIGS. 5 and 6.

In next step 140, a determination is made as to whether there exists a remaining group of adjacent points from the vertices of the ground-contact surface, so as to determine whether there exists another wall surface. If there exists another wall surface, i.e., if the determination in step 140 is affirmative, the procedure is returned to step 134, and the above process is repeated. In this way, angles $\theta_1$, $\theta_2$, $\theta_3$, . . . (which will be indicated hereinafter in general as $\theta_i$, wherein i=1, 2, . . . the maximum number of wall surfaces) are calculated for each of the wall surfaces. When the angles $\theta_i$ have been calculated for all of the wall surfaces (when the determination in step 140 is negative), the wall surface angles $\theta_i$ are set as the design variables $r_i$ in next step 142.

After the object function OBJ, the constraint condition G and the design variables $r_i$ have been determined in this manner, an initial value OBJo of the object function OBJ and an initial value Go of the constraint condition G at an initial values ro of the design variables $r_i$ are calculated in step 104 in FIG. 2.

Next, in step 106 in FIG. 2, the design variables $r_i$ are each continuously varied by $\Delta r_i$ in order to vary the basic shape model. When the design variables $r_i$ are varied, all of the design variables $r_i$ may be varied simultaneously, or one of the design variables $r_i$ may be varied, or a plurality of design variables among all of the design variables $r_i$ may be varied by $\Delta r_i$ simultaneously. In next step 108, a shape of each of the blocks formed by angles of the wall surfaces which have been varied by $\Delta r_i$ is determined, i.e., coordinates of each of points $D_1$, $D_2$, $D_3$, $D_4$, $D_{11}$, $D_{12}$, $D_{13}$, $D_{14}$ which have been obtained by varying the angles of the wall surfaces are determined, so that each of block shapes after the design variable has been varied by $\Delta r_i$, i.e., each modified shape model, is determined.

In step 110, a value $OBJ_i$ of the object function and a value $G_i$ of the constraint condition, after the design variable has been varied by $\Delta r_i$ with respect to the modified shape model determined in step 108, are calculated. In step 112, a sensitivity $dOBJ/dr_i$ of the object function, which is a ratio of the variation amount of the object function to the unit variation amount of the design variable, and a sensitivity $dG/dr_i$ of the constraint condition, which is a ratio of the variation amount of the constraint condition to the unit variation amount of the design variable, are calculated for every design variable, in accordance with the following equations:

$$dOBJ/dr_i=(OBJ_i-OBJo)/\Delta r_i$$
$$dG/dr_i=(G_i-Go)/dr_i \qquad (3)$$

By these sensitivities, it is possible to estimate to what extent the value of the object function and the value of the constraint condition will vary when the design variable is varied by $\Delta r_i$. These sensitivities may be obtained analytically depending upon the techniques used for modeling the tire or properties of the design variable. In such a case, the calculation in step 110 is unnecessary.

In next step 114, using the initial value OBJo of the object function, the initial value Go of the constraint condition, the initial value ro of the design variable, and the sensitivities, there is estimated by mathematical programming a variation amount of the design variable which minimizes the object function i.e., minimizes the standard deviation of the block rigidities, while satisfying the constraint condition. Using the estimated value of the design variable, the modified shape models are determined in step 115 by using the same method as that of step 108, and the object function value is calculated. In step 116, the difference between the object function value OBJ calculated in step 115 and the initial value OBJo of the object function calculated in step 104, and a threshold value which has been previously input are compared with each other to determine whether the value of the object function converges. If the value of the object function does not converge, steps 104 to 116 are repeated while using the design variable value determined in step 114 as the initial value. When it is determined that the value of the object function has converged, the value of the design variable at that time is determined as the value of the design variable which minimizes the object function while satisfying the constraint condition, and in step 120, the block shape forming the tire is determined by using this design variable value.

Figure 7:
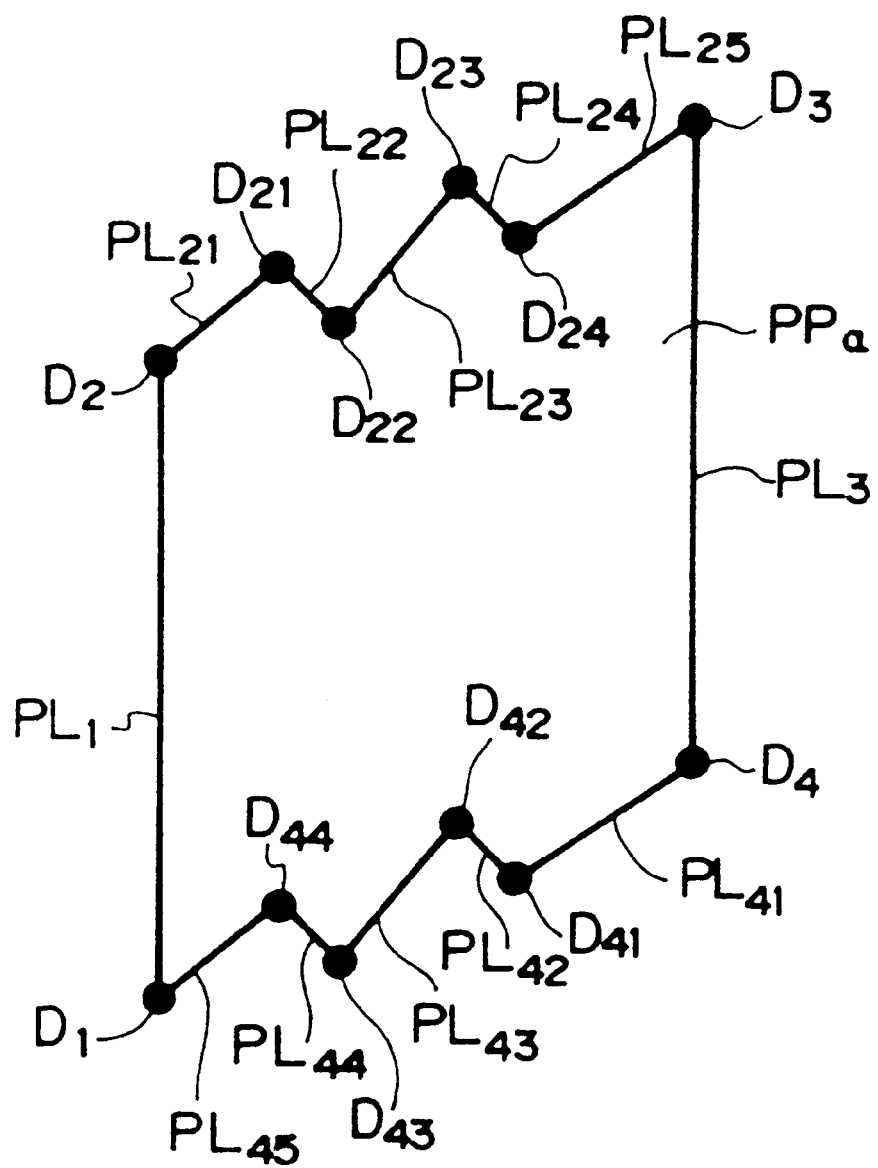
FIG. 7 is a diagram for showing a shape of a ground-contact surface for explaining design variables of a number of wall surfaces.

Although a case in which one block has four wall surface is described in the present embodiment, the present invention can also be applied to a block formed with a large number of wall surfaces. Such a block formed with a large number of wall surfaces can be considered to have a ground-contact surface having a plurality of lines representing a ground-contact surface shape formed as a polygon. For example, as shown in FIG. 7, a ground-contact surface PPa of one block has four basic points $D_1$, $D_2$, $D_3$ and $D_4$. Between the points $D_2$ and $D_3$, points $D_{21}$, $D_{22}$, $D_{23}$ and $D_{24}$ are formed, and lines $PL_{21}$, $PL_{22}$, $PL_{23}$, $PL_{24}$ and $PL_{25}$ are formed instead of the line $PL_2$ connecting the points $D_2$ and $D_3$ (FIG. 4). Similarly, between the points $D_1$ and $D_4$, points $D_{41}$, $D_{42}$, $D_{43}$ and $D_{44}$ are formed, and lines $PL_{41}$, $PL_{42}$, $PL_{43}$, $PL_{44}$ and $PL_{45}$ are formed instead of the line $PL_4$. Therefore, wall surfaces $HP_1$, $HP_{21}$, $HP_{22}$, $HP_{23}$, $HP_{24}$, $HP_{25}$, $HP_3$, $HP_{41}$, $HP_{42}$, $HP_{43}$, $HP_{44}$, $HP_{45}$ which are continuous from the lines are connected to the ground-contact surface PPa. At least one of these wall surfaces $HP_1$ to $HP_{45}$ can be determined as a design variable.

Figure 8:
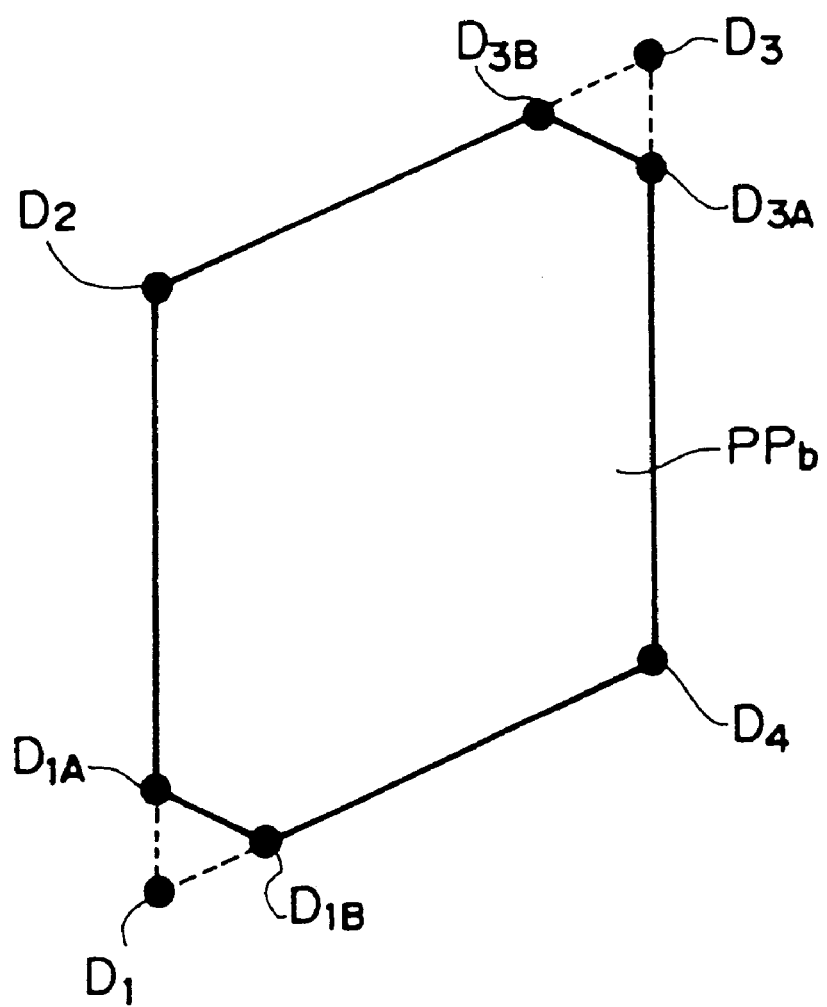
FIG. 8 is a diagram for showing a shape of a ground-contact surface of a chamfered block.

Further, as shown in FIG. 8, it is easy to apply the present invention to a block shape from which an angle of one block is cut by a predetermined amount, i.e., a so-called chamfered block shape. FIG. 8 shows a case in which a ground-contact surface PPb of one block has four basic points $D_1$, $D_2$, $D_3$ and $D_4$, and the point $D_1$ side and the point $D_4$ side are chamfered. It is possible to determine the chamfering amount by determining the coordinates of points $D_{1A}$ and $D_{1B}$, which are to be formed by cutting the angle at the point $D_1$ side of the block, and the coordinates of points $D_{3A}$ and $D_{3B}$, which are to be formed by cutting the angle at the point $D_4$ side of the block. Therefore, if the chamfering amount is determined in advance, the positions, i.e., the points, to be chamfered can be determined, and at least one of the wall surfaces including a wall surface to be formed by chamfering can be determined as a design variable.

Figure 9:
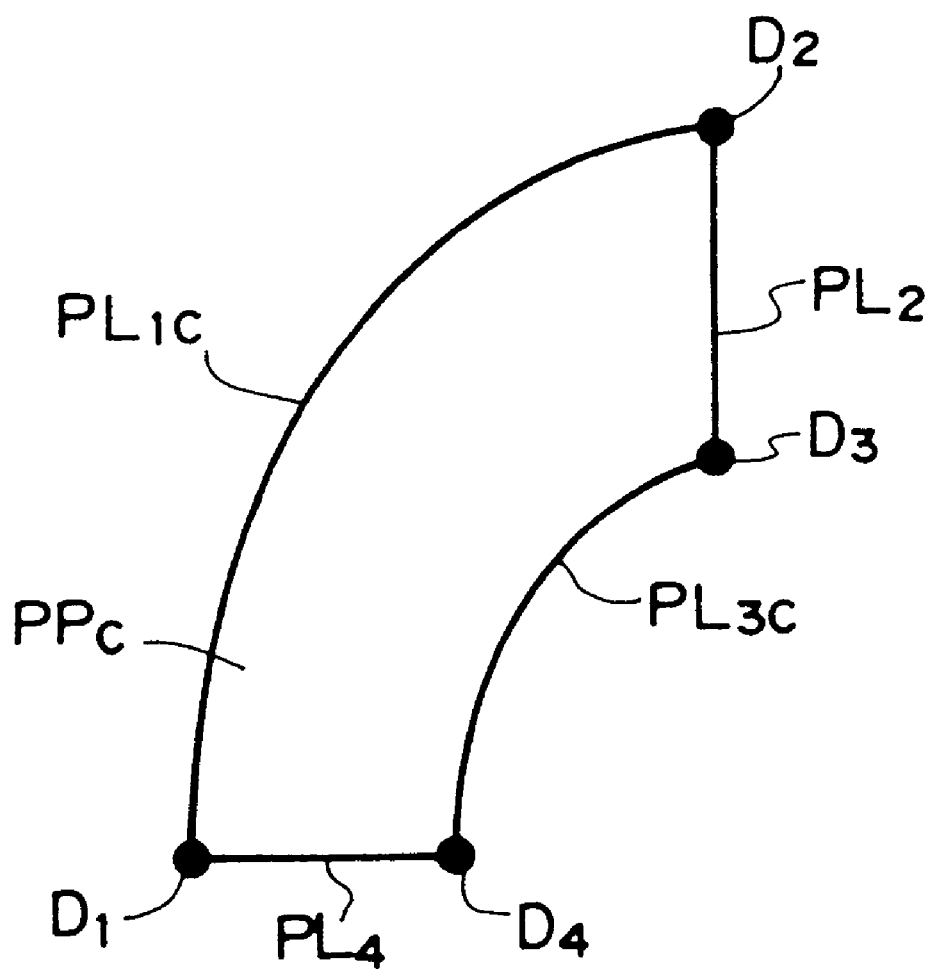
FIG. 9 is a diagram for showing a shape of a ground-contact surface of a block having a curved wall surface.
Figure 10:
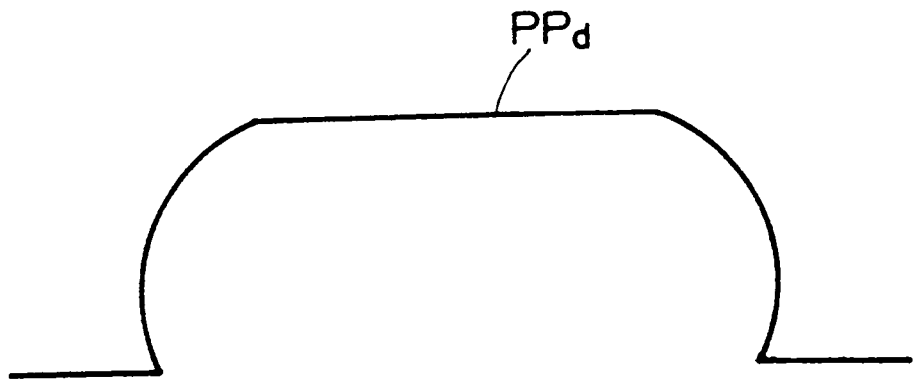
FIG. 10 is a diagram for showing a cross-sectional configuration of a block having a wall surface which is curved in a direction different from that in FIG. 9.

Although a case in which the line forming the wall surface of the block is a straight line is described above, the line is not limited to a straight line only, and the line may be a curved line represented by a predetermined function as shown in FIG. 9. In the example shown in FIG. 9, the ground-contact surface PPc of one block has four points $D_1$, D2, $D_3$ and $D_4$. A line $PL_{1c}$ connecting points $D_1$ and $D_2$ is represented by a predetermined function (e.g., a multidimensional curved line or hyperbola), and a line $PL_{3c}$ connecting points $D_3$ and $D_4$ is also represented by a predetermined function (e.g., a multidimensional curved line or hyperbola). In this case, the curved line shapes of the lines $PL_{1c}$ and $PL_{3c}$ may be determined by Lagrangian interpolation, or the curved line itself may be varied as a design variable. Although a wall surface which is continuous from each line of the ground-contact surface PPc becomes a curved surface, one wall surface may be divided into fine regions (fine planes), and the wall surface may be determined using Lagrangian interpolation or the like. Further, the shape of the wall surface itself which is continuous from the ground-contact surface PPc may be a curved surface as shown in FIG. 10.

The rigidities of a single block in all directions can be made uniform in this manner. Therefore, shapes of lug grooves, shapes of rib grooves and the like of the tire can be made appropriately, shapes at positions in the widthwise direction of a tire can be made appropriately, and high level irregular wear resistance and running performance can both be established, in accordance with required performances and the frequency of use during cornering and straight running, without applying the widthwisely divided tread and without being influenced by the block shape at the ground-contact surface of the tire tread portion.

[Second Embodiment]

Next, a second embodiment will be described. The second embodiment uses a design variable different than that of the above-described embodiment. Since the second embodiment is substantially the same as the above-described embodiment, the same portions are denoted by the same reference symbols, and detailed descriptions thereof will be omitted.

Figure 11:
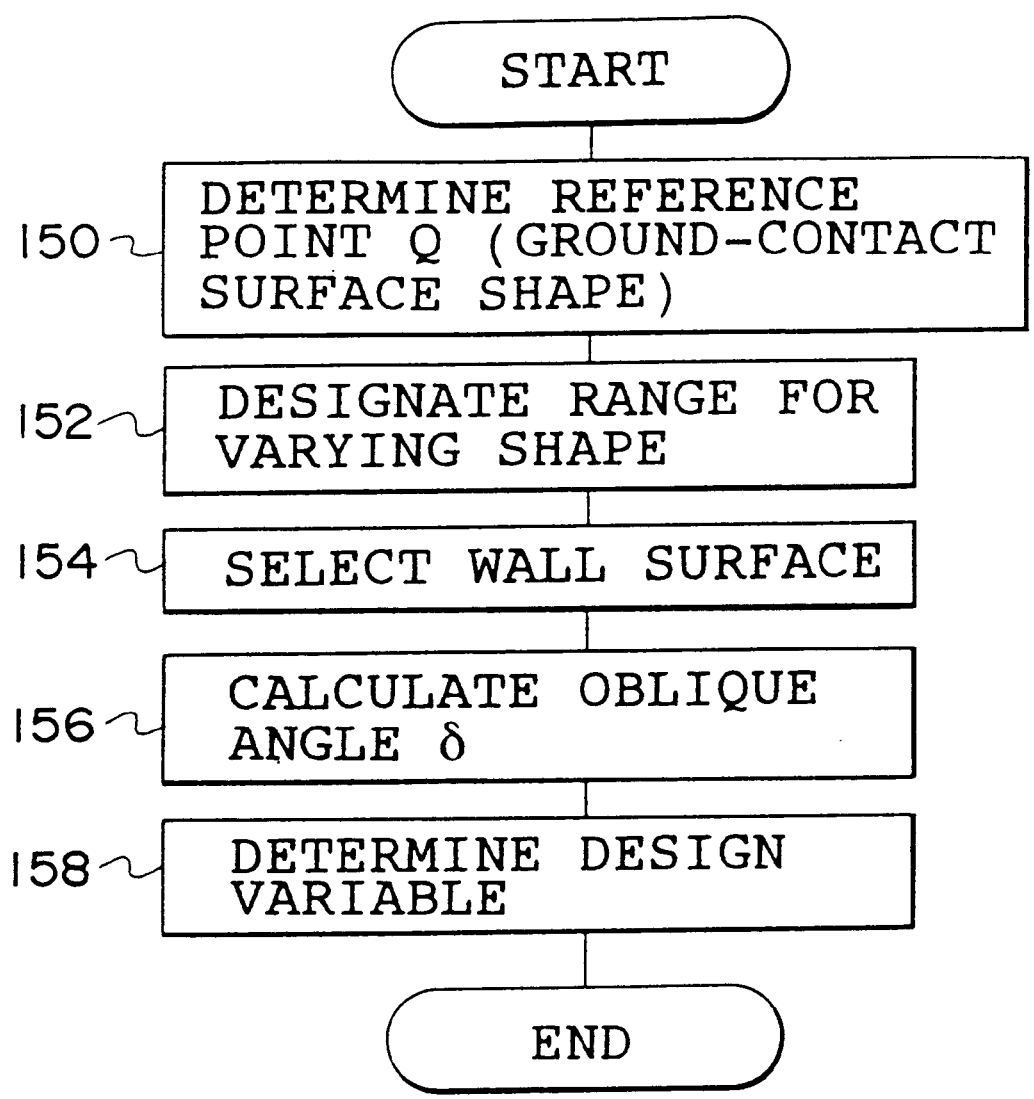
FIG. 11 is a flowchart showing a flow of design variable determination processing of a second embodiment.
Figure 12:
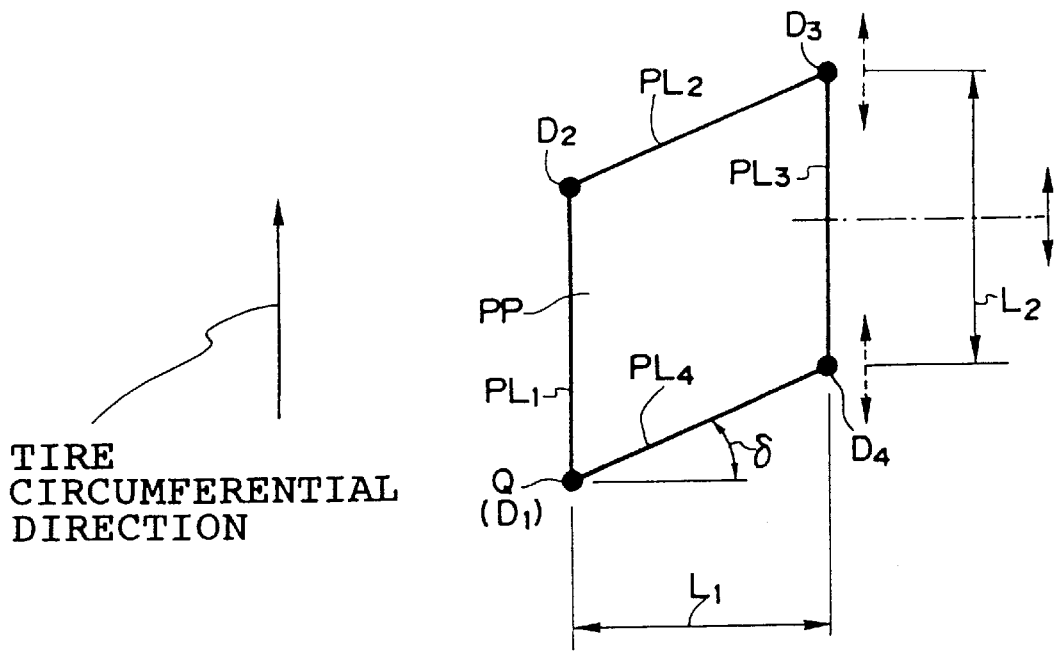
FIG. 12 is a view for explaining a design variable of the second embodiment.

In the present embodiment, an oblique angle is used as the design variable, and is set by the oblique angle calculating routine shown in FIG. 11. In step 150 of the oblique angle calculating routine, a reference point Q is set at a predetermined point (at vertex $D_1$ in the example shown in FIG. 12) of the ground-contact surface of the tire as shown in FIG. 12. In next step 152, a range in which the line of the ground-contact surface of the block can be inclined is designated as a range in which the block shape (ground-contact surface shape) is varied. In step 154, a wall surface of the block is selected by selecting a point for inclining the line among points which are adjacent to the designated vertex of the ground-contact surface. In the example shown in FIG. 12, the line $PL_4$ which is continuous with the wall surface $HP_4$ is selected by selecting the point $D_4$. In order to maintain opposing lines of the block shape parallel, it is preferable to also select the corresponding line $PL_2$ when the line $PL_4$ is selected. In next step 156, an angle δ defined between the selected line $PL_4$ and a reference line (a straight line parallel to the widthwise direction of the tire) is calculated. This angle δ is the oblique angle.

In next step 158, coordinates of the points $D_3$ and $D_4$ defining the lines $PL_2$ and $PL_4$ are obtained as variables for varying the oblique angle. Since a length $L_1$ in the tire widthwise direction and a length $L_2$ in the tire circumferential direction of this ground-contact surface shape are previously determined, the angle δ must be varied without varying these lengths. To this end, the points $D_3$ and $D_4$ may be moved in the tire circumferential direction. The amount of movement $S_i$ is set as the design variable $r_i$.

After the object function OBJ, the constraint condition G and the design variable $r_i$ have been determined in this manner, an initial value OBJo of the object function OBJ and an initial value Go of the constraint condition G at an initial value ro of the design variable $r_i$ are calculated (step 104 in FIG. 2). Next, similarly to the above-described embodiment, the design variable $r_i$ is continuously varied by $\Delta r_i$, and the block shape, i.e., the modified shape model, is determined (steps 106, 108). A value $OBJ_i$ of the object function and a value $G_i$ of the constraint condition after the design variable has been varied by $\Delta r_i$ with respect to the modified shape model are calculated, and a sensitivity $dOBJ/dr_i$ of the object function and a sensitivity $dG/dr_i$ of the constraint condition are calculated for each design variable (steps 110, 112). Next, a variation amount of the design variable which minimizes the standard deviation of the block rigidity in all directions is estimated. The modified shape model is determined, and the object function value is calculated to determine a block shape forming the tire by using the value of the design variable (steps 114 to 120).

Figure 13:
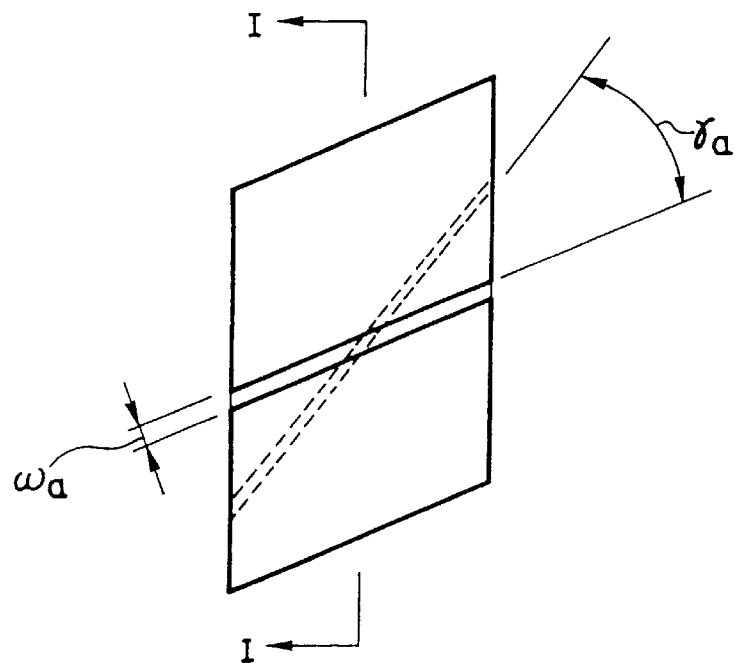
FIG. 13 is a diagram showing various shapes of a sipe formed in a block.
Figure 14:
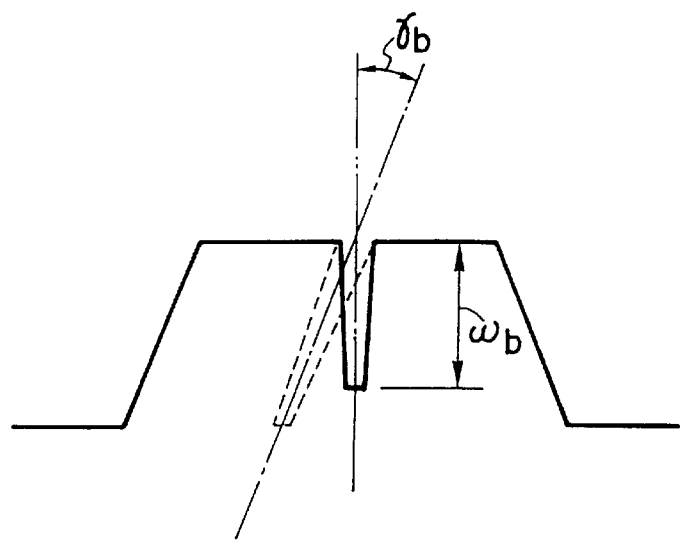
FIG. 14 is a sectional view taken along line I—I in FIG. 13.
Figure 15:
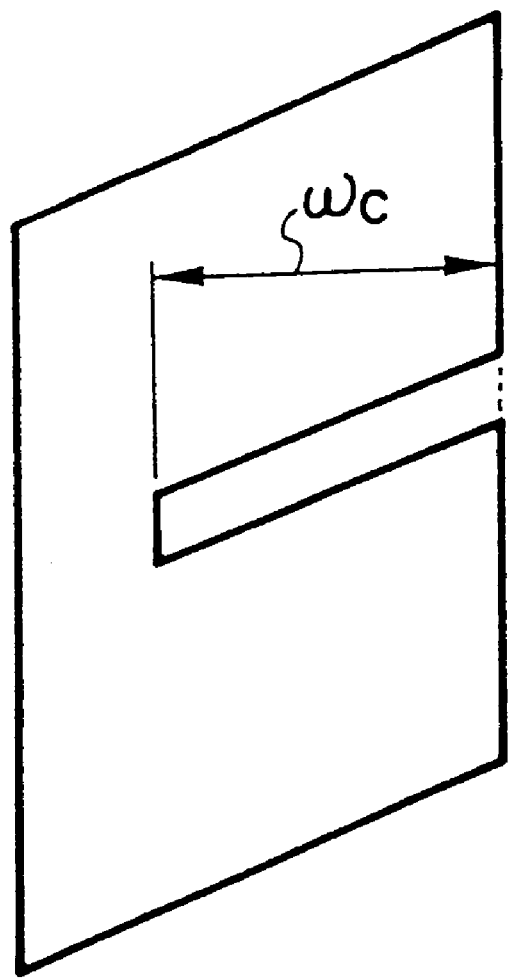
FIG. 15 is a diagram showing a length of a sipe formed midway into a block.

Another example of the design variable is the number of sipes formed in the block. AS shown in FIG. 13, a sipe has a width wa and an inclination γa. Further, as shown in FIG. 14, a sipe has a depth wb and inclination γb within the block. Further, the sipe need not pass through the block, and as shown in FIG. 15, a sipe has a length wc when the sipe is formed midway into a block.

[Third Embodiment]

Next, a third embodiment will be described. The third embodiment designs the block shape of a tire by a genetic algorithm, and uses design variables different than those of the above-described embodiments. Since the present embodiment is substantially the same as the above-described embodiments, the same portions are denoted by the same reference symbols, and detailed descriptions thereof will be omitted.

Figure 16:
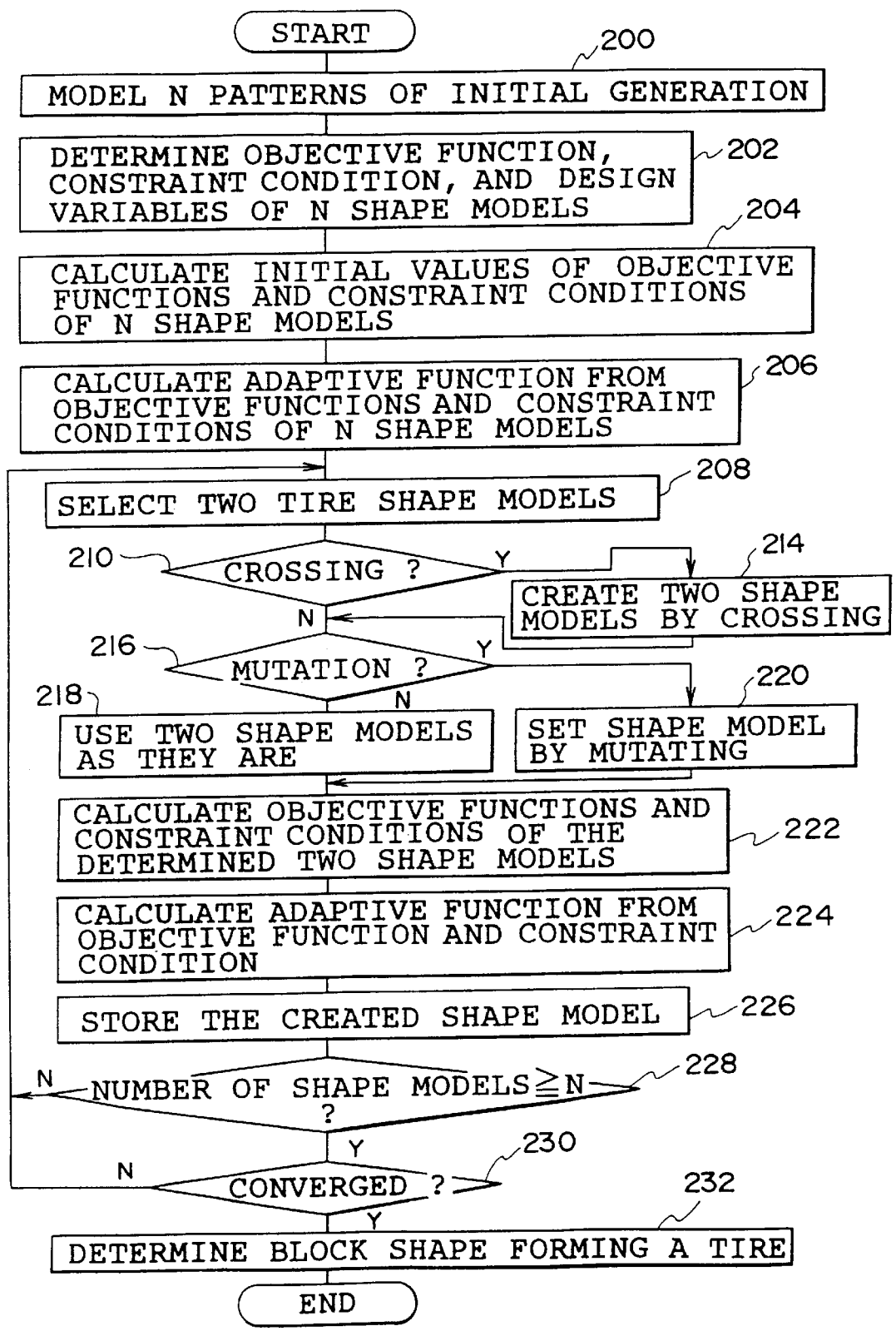
FIG. 16 is a flowchart showing a flow of a shape design processing routine according to a third embodiment of the present invention.

FIG. 16 shows a processing routine of a program of the present embodiment. In step 200, N block shapes (N is a number) are modeled by a technique which can numerically and analytically determine the block rigidities, such as the finite element method, so as to obtain a basic shape model including an internal structure. Here, N is input in advance by a user. A basic shape model used in the present embodiment is the same as that shown in FIG. 4 of the first embodiment.

In next step 202, an object function representing a physical amount for evaluating a performance of a tire, constraint conditions for limiting the tire shape, and a design variable for determining N shape model block shapes are determined. In the present embodiment, in order to improve the irregular wear resistance and the steering stability, the object function OBJ and the constraint condition G are determined as follows:

Object function OBJ: Block rigidities are made uniform in all directions.

Constraint condition G: Tread thickness limiting the tire shape is made uniform.

A wall surface angle which is the design variable is determined for each of the N shape models by the angle calculation routine in FIG. 3 which was described in the first embodiment. Since this process is the same as that of the first embodiment, description thereof will be omitted.

After the object function OBJ, the constraint condition G and each of the design variables $r_{i,j}$ (J=1, 2, . . . , N) of the N shape models have been determined by repeating the angle calculation routine N times, in step 204 in FIG. 16, the object function $OBJ_J$ and the constraint condition $G_J$ of each of the N design variables $r_{i,J}$ of the N shape models are calculated.

In next step 206, by using the object function $OBJ_J$ and the constraint condition $G_J$ of each of the design variables $r_{i,J}$ of the N shape models obtained in step 204, an adaptive function of each of the N shape models is calculated in accordance with the following equation (4). In the present embodiment, for example, in order to make the block rigidities uniform in all directions, the value of the adaptive function (fitness) increases as the standard deviation of the block rigidities in all directions decreases.

$$\Phi_J = -OBJ_J + \gamma \cdot \max(G_J, 0) F_J = -\Phi_J \quad (4)$$

or, $$F_J = 1/\Phi_J$$

or, $$F_J = -a \cdot \Phi_J + b$$

wherein $a = \Phi_{avg}(c-1)/(\Phi_{avg} - \Phi_{min})$
$b = \Phi_{avg}(c - \Phi_{min})/(\Phi_{avg} - \Phi_{min})$ $$\Phi_{avg} = \frac{\sum_{J=1}^{N} \Phi J}{N}$$

c: constant
γ: penalty coefficient
$\Phi_{min} = \min(\Phi_1, \Phi_2, \ldots \Phi_N)$
$\Phi_J$: penalty function of J-th shape model of N shape models (J=1, 2, 3, ... N)
c and γ are previously input by a user.

In next step 208, two shape models for crossing are selected from the N shape models. A generally known fitness proportion strategy is used as the method of selection. The probability Pe that a certain shape model e will be selected from the N shape models is represented by the following equation:

$$Pe = Fe \bigg/ \sum_{J=1}^{N} Fj$$

wherein
Fe: adaptive function of a certain shape model e among the N tire models
$F_J$: J-th adaptive function of the N tire models
J=1, 2, 3, ... N Although the fitness proportion strategy is used in the present embodiment, other strategies may be used such as expected value strategy, rank strategy, elite conservation strategy, tournament selection strategy, GENITOR algorithm and the like, as set forth in "Genetic Algorithm" edited by Hiroaki Kitano.

In next step 210, it is determined whether the selected two shape models should be crossed at the probability T which is input in advance by the user. Here, "cross" means that portions of an element of the two shape models are exchanged, as will be described later. If the determination is negative, i.e., if the selected two shape models should not be crossed, the routine proceeds as is to step 216. On the other hand, if the determination is affirmative, i.e., if the selected two shape models should be crossed, the two shape models are crossed in step 214 as will be described later.

Figure 17:
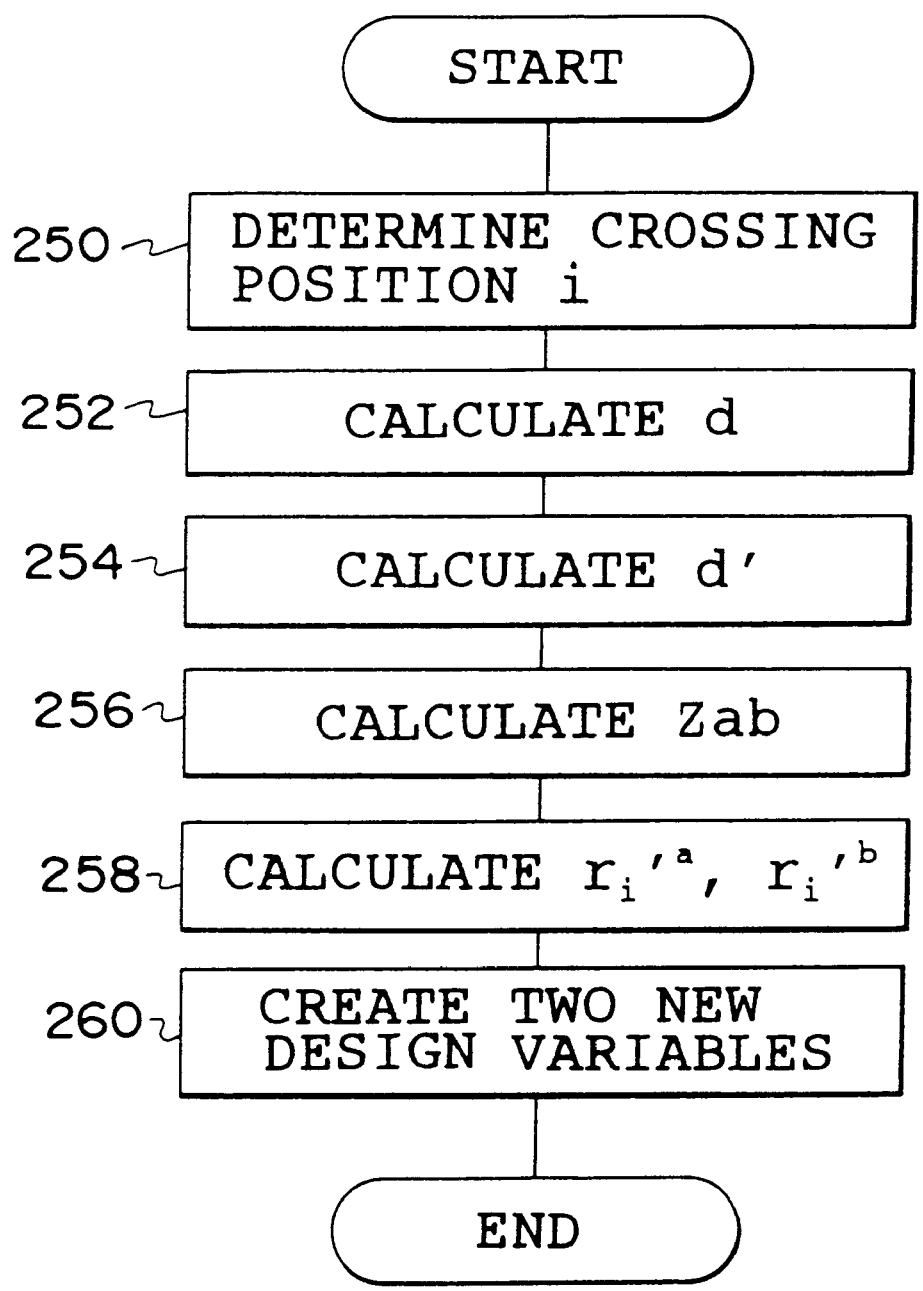
FIG. 17 is a flowchart showing a flow of crossing processing.

Crossing of the two shape models is carried out in accordance with the crossing routine shown in FIG. 17. First, in step 208, the selected two shape models are set to be shape model a and shape model b, the design variable of each of the shape model a and the shape model b is represented by a design variable vector including a row, the design variable vector of the shape model a is represented by $Vr^a = (r_1^a, r_2^a, \ldots, r_i^a, \ldots, r_{n-1}^a)$, and the design variable vector of the shape model b is represented by $Vr^b = (r_1^b, r_2^b, \ldots, r_i^b, \ldots r_{n-1}^b)$. In step 250 in FIG. 17, previously determined random numbers are generated, and a crossing location i concerning the design variable vectors of the shape models a and b is determined in accordance with the random numbers.

In next step 252, with respect to the design variables $r_i^a$, $r_i^b$ of the shape models a, b which were determined to be crossed, a distance d is obtained in accordance with the following equation:

$$d = |r_i^a - r_i^b|$$

In next step 254, using the minimum value $B_L$ and the maximum value $B_U$ in the possible range of the $r_1^a$ and $r_i^b$, a normalized distance d' is obtained in accordance with the following equation:

$$d' = d/(B_U - B_L)$$

Figure 19A:
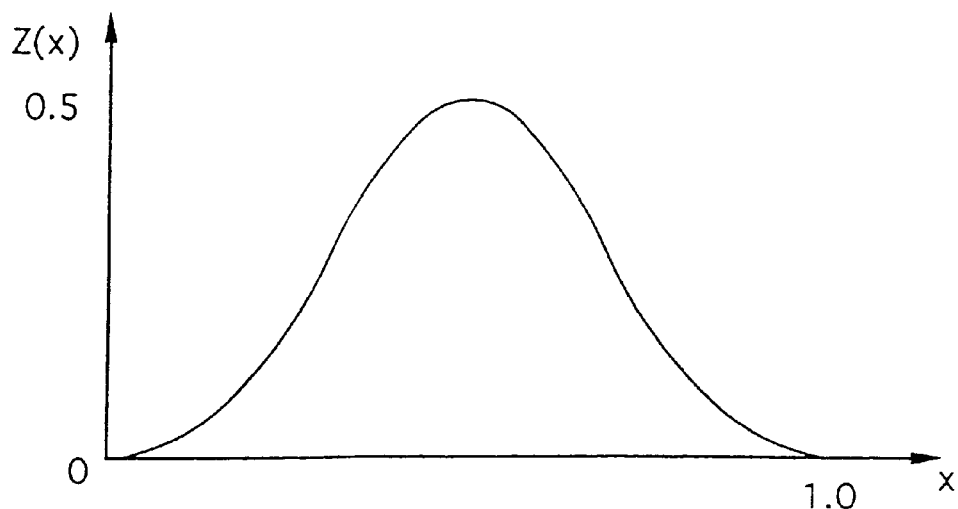
FIG. 19A is a diagram showing a continuous mountain shaped map function.
Figure 19B:
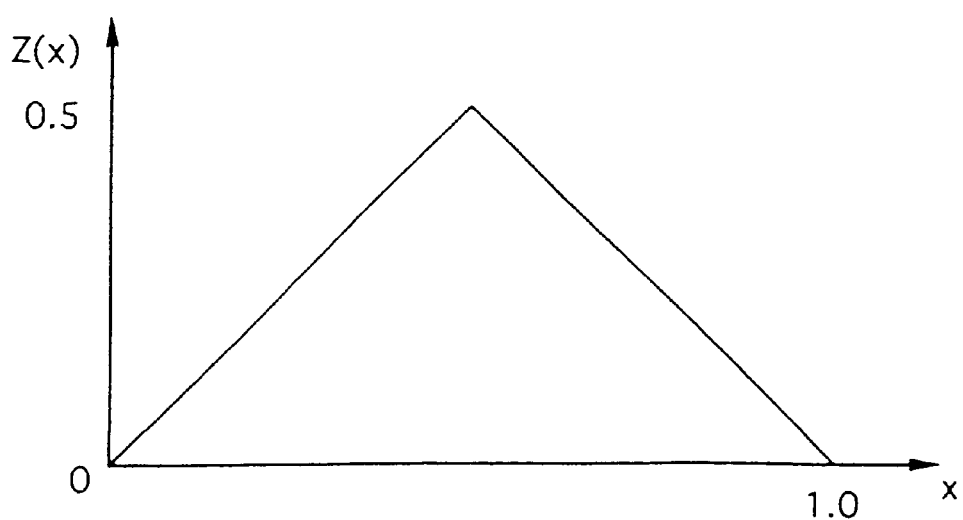
FIG. 19B is a diagram showing a linear mountain shaped map function.

In step 256, in order to disperse the values of the normalized distance d' to a proper degree, by using the mountain shaped map function Z(x) (0≦x≦1, 0≦Z(x)≦0.5) as shown in FIGS. 19A and 19B, function value $Z_{ab}$ is obtained in accordance with the following equation:

$$Z_{ab} = Z(d')$$

After the function value $Z_{ab}$ has been obtained in this manner, new design variables $r_i'^a$, $r_i'^b$ are obtained in step 258 in accordance with the following equations:

$$r_i'^a = r_i^a - \min(|r_i^a - B_L|, |r_i^a - B_U|)/0.5 \cdot Z_{ab}$$

$$r_i'^b = r_i^b + \min(|r_i^b - B_L|, |r_i^a - B_U|)/0.5 \cdot Z_{ab}$$

or, $$r_i'^a = r_i^a + \min(|r_i^a - B_L|, |r_i^a - B_U|)/0.5 \cdot Z_{ab}$$

$$r_i'^b = r_i^b - \min(|r_i^a - B_L|, |r_i^a - B_U|)/0.5 \cdot Z_{ab}$$

After the $r_i'^a$ and $r_i'^b$ have been obtained in this manner, in step 260, design variable vector $Vr'^a$ and $Vr'^b$ which are rows of the new design variables are obtained as follows:

$$Vr'^a = (r_1^a, r_2^a, \ldots r_i'^a, r_{i+1}^b, \ldots, r_{n-1}^b)$$
$$Vr'^b = (r_1^b, r_2^b, \ldots r_i'^b, r_{i+1}^a, \ldots, r_{n-1}^a)$$

Figure 20A:
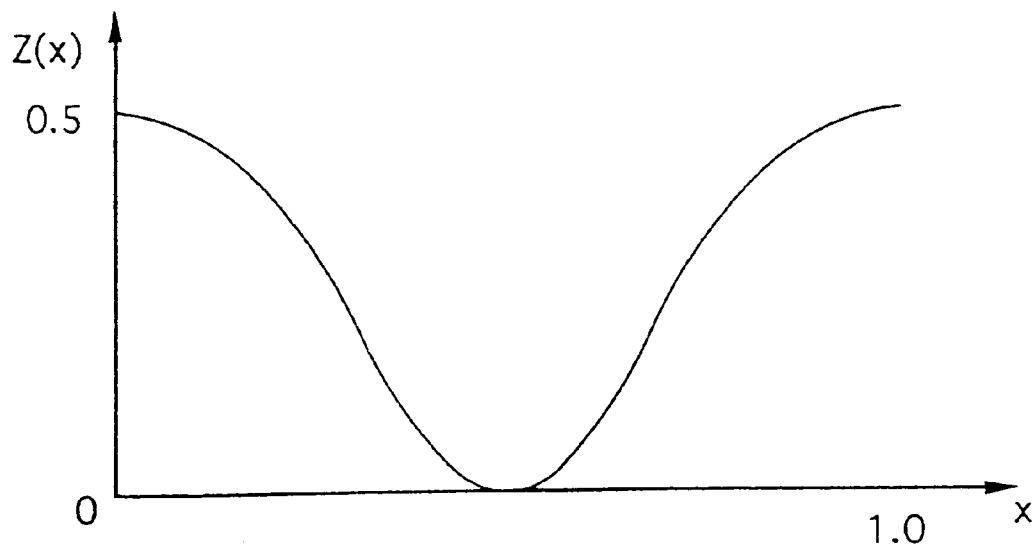
FIG. 20A is a diagram showing a continuous valley shaped map function.
Figure 20B:
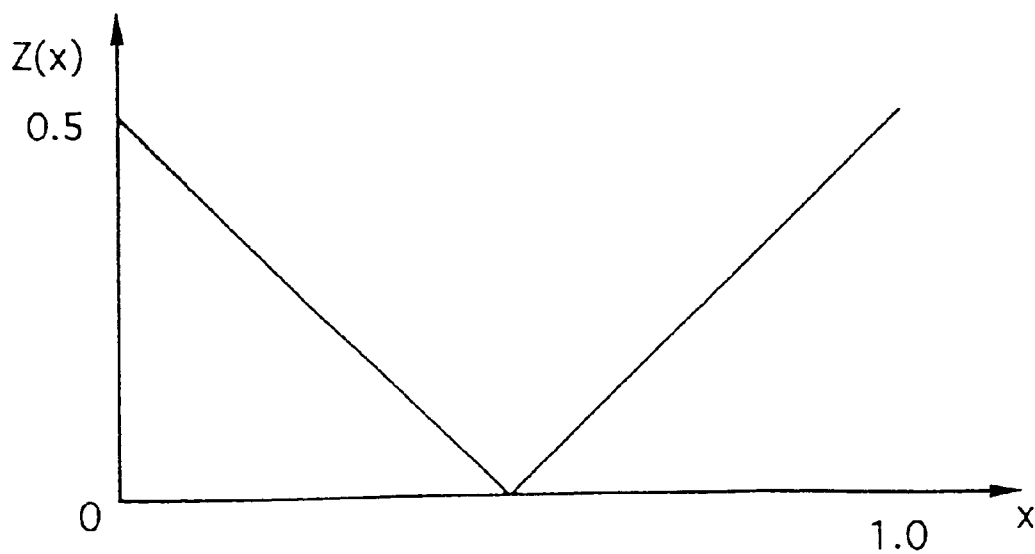
FIG. 20B is a diagram showing a linear valley shaped map function.

The minimum value $B_L$ and the maximum value $B_U$ in the possible range of $r_i$ are input in advance by the user. The map function Z(x) maybevalley shaped function as shown in FIGS. 20A and 20B. In the above described example, there is one crossing location i, but a plurality of crossings or an even crossing may be used as set forth in "Genetic Algorithm" edited by Hiroaki Kitano.

After two new shape models have been creased by such a crossing, in step 216 in FIG. 16, it is determined whether a mutation should be carried out at the probability S which is input in advance by the user. The term "mutation" means that a portion of the design variable is finely varied as will be described later, so as to increase the probability of including a population which can be an optimal design variable. If the determination in step 216 is negative, i.e., if no mutation is to be carried out, in step 226, the current two shape models are maintained as they are, and the procedure is advanced to next step 222. If the determination in step 216 is affirmative, i.e., if a mutation is to be carried out, a mutation is carried out in step 220 in the following manner.

Figure 18:
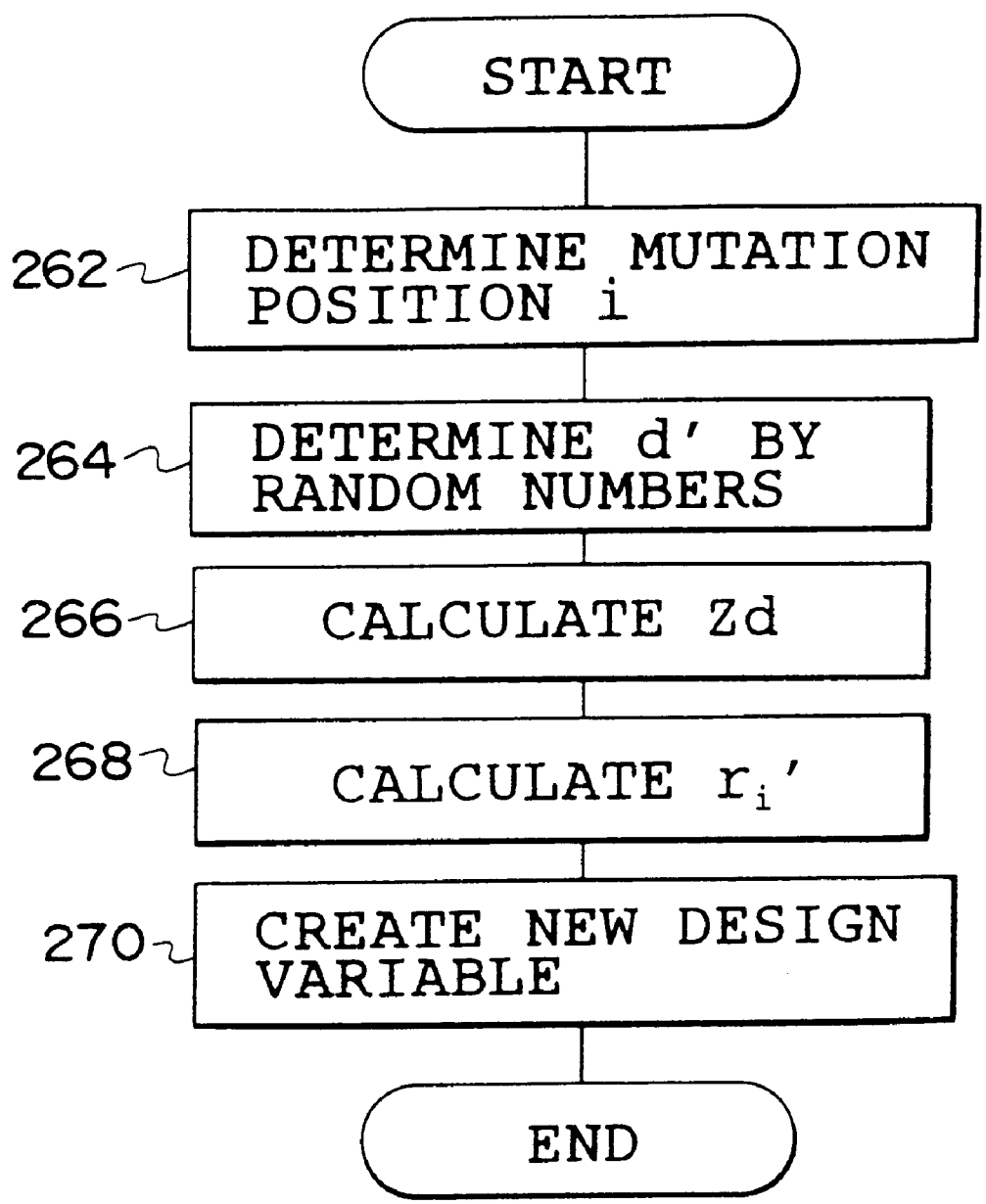
FIG. 18 is a flowchart showing a flow of mutation processing.

The mutation is carried out by the mutation routine shown in FIG. 18. First, random numbers are generated in step 262, and a location i for mutation is determined by the random numbers. In next step 264, a distance d' is determined by the random numbers within the following range:

$$0 \leq d' \leq 1$$

In next step 266, by using the mountain shaped map function $Z(x)$ ($0 \leq x \leq 1$, $0 \leq Z(x) \leq 0.5$) shown in FIGS. 19A and 19B, or by using the valley shaped map function $Z(x)$ shown in FIGS. 20A and 20B, a function value Zd is determined in accordance with the following equation:

$$Zd = Z(d')$$

After the function value Zd has been determined in this manner, a new design variable $r_i'$ is determined in step 268 in accordance with the following equations:

$$r_i' = r_i - \min(|r_i - B_L|, |r_i - B_U|)/0.5 \cdot Zd$$

or, $$r_i' = r_i + \min(|r_i - B_L|, |r_i - B_U|)/0.5 \cdot Zd$$

After the design variable $r_i'$ has been determined in this manner, a design variable vector Vr' which is a row of the new design variables obtained in step 270 is as follows:

Vr' = $(r_1, r_2, \ldots, r_i', r_{i+1}, \ldots, r_{n-1})$

A value of the object function and a value of the constraint condition are calculated in step 222 in FIG. 29 for the two shape models which have been newly-created in this manner. In next step 224, an adaptive function is calculated by using equation (4) as in the same manner as that in the previously-described embodiment, from the obtained value of the object function and value of the constraint condition.

In next step 226, the two shape models are stored. In next step 228, it is determined whether the number of shape models stored in step 226 has reached N. If N has not been reached, steps 208 to 228 are repeated until N is reached. On the other hand, if the number of shape models reaches N, a convergence judgement is made in step 230. If there is no convergence, N shape models are updated to the shape models stored in step 226, and steps 208 to 230 are repeated. On the other hand, if it is determined in step 230 that there is convergence, the value of the design variable of the shape model having the maximum object function value among the N shape models while substantially satisfying the constraint condition is used as the value of the design variable which maximizes the object function while substantially satisfying the constraint condition. The tire shape is determined using this value of the design variable in step 232.

In the convergence judgement in step 230, if any one of the following constraint conditions is satisfied, it is determined that there is convergence.

1) The number of generations reaches a number M.
2) The number of line arrays having the greatest object function value becomes q% or greater.
3) The value of the greatest object function is not updated at the subsequent p-th generation.

M, q and p are input in advance by the user.

The present embodiment may be applied to the design variable of the first or second embodiment.

In the present embodiment, since the amount of calculation is slightly increased as compared with the first embodiment, the time required for the development of the design is slightly increased, but there is the effect that a tire having better performance can be designed.

In this way, in the present embodiment, the rigidities in all directions at a block unit can be made uniform. Therefore, the shape of a lug groove, the shape of a rib groove, the shape of a sipe, and the like of the tire can be made appropriately and appropriateness of the tire transverse direction position can be achieved, in accordance with required performances and frequency of use at the time of cornering and at the time of straight running, without using a widthwisely-divided tread and without affecting the block configuration at the ground-contact surface of the tire tread portion. Both wear resistance and running performance can be established to a high degree.

Examples of the present invention will be described in detail hereinafter with reference to the accompanying drawings.

FIRST EXAMPLE

A first example will be described next. In the present example, the present invention is applied to the optimization of a rectangular parallelepiped block.

As shown in FIG. 21, it is supposed that a rectangular parallelepiped block is formed into a shape of 20 mm×27 mm×8 mm. This rectangular parallelepiped block has a long side having a length LB of 27 mm in the tire circumferential direction, and a short side having a length LA of 20 mm in the tire widthwise direction which is perpendicular to the tire circumferential direction, and a height DP of 8 mm. The groove wall surface angles of the groove walls $HP_1$ and $HP_3$ which are continuous with the short sides having the length LA are both set to $\epsilon$. The groove wall surface angles of the groove walls $HP_2$ and $HP_4$ which are continuous with the long sides having the length LB are both set to $\phi$.

This rectangular parallelepiped block is optimized as described in the above embodiment. That is, groove wall surface angles which equalize block rigidities in the circumferential direction and the widthwise direction are set. Accordingly, since the block behaves similarly with respect to inputs from all of the directions, an improvement of the uneven wear resistance and the steering stability can be expected.

In the present example, the object function, the constraint condition and the design variable are determined as follows.

Object function: Block rigidities in the circumferential direction and the widthwise direction are made equal. If this is expressed by using a numerical formula, this means that (rigidity in the circumferential direction−rigidity in the widthwise direction)$^2$ is minimized.

Design variable: Two variables, which are the groove wall surface angle $\epsilon$ which is continuous with the side having a length of 20 mm and the groove wall surface angle $\phi$ which is continuous with the side having a length of 27 mm are employed. The initial values of both of the angles are set to 3°.

Constraint condition: Taking the removal of the tire from a mold into consideration, both the groove wall surface angles $\epsilon$ and $\phi$ are set to 1° or more.

The rectangular parallelepiped block was optimized by the object function, the constraint condition and the design variable, and as a result, a groove wall surface angle ε=1° and a groove wall surface angle φ=13° were obtained. FIGS. 22A and 22B show the block rigidities in the circumferential direction and the widthwise direction. FIG. 22A shows block rigidities before optimization, and FIG. 22B shows block rigidities after optimization. As can be understood from FIGS. 22A and 22B, the circumferential direction and widthwise direction rigidities were equalized after optimization.

SECOND EXAMPLE

A second example will be described next. In the present example, the present invention is applied to the determination of the number of sipes and the depth thereof.

In the present embodiment, a block shape, to which one sipe is added, in a studless tire is optimized.

As shown in FIG. 23A, in one block, three sipes having a depth DPa are provided along the widthwise direction of the tire. As shown in FIG. 23B, a case in which one sipe is added to this block is optimized as described in the previous embodiment. That is, even if the number of sipes is changed, a sipe depth which makes the block rigidities equal is set.

Here, the present inventor conducted an experiment in which the number of sipes was increased from three to four without changing the depth. As a result, the block rigidity in a direction perpendicular to the sipe (the circumferential direction) fell from 9.6 to 7.3 (a 27% reduction). The reason for this is believed to be that, if one sipe is added, because the edge length increases, the running performance on ice is enhanced. However, since the block rigidity fell as much as 24%, it is feared that, conversely, the performance would deteriorate. Thus, optimization was conducted to design a block having four sipes and having block rigidities greater than or equal to those of a block having three sipes.

In the present example, the object function and the design variable are determined as follows.

Object function: Rigidities of a block having three sipes and rigidities of a block having four sipes are equalized. If this is expressed by using numerical formula, this means that (rigidities of a block having four sipes−rigidities of a block having three sipes)$^2$ is minimized.

Design variable: Depths of four sipes.

The initial value was 7 mm. (Three sipes were fixed to 7 mm, and only the fourth sipe was changed.)

As a result of the optimization of the sipes using the above object function and design variable, the depth of four sipes was 5.9 mm, and block rigidities equal to a block having three sipes could be obtained. FIG. 24 shows the block rigidities with respect to the sipes. As can be understood from FIG. 24, although the rigidity of a block having three sipes of the same depth is 9.6 and the rigidity of a block having four sipes of the same depth is 7.3, after the optimization of the present example, four sipes and three sipes provide equal block rigidities.

The present inventor actually prepared a tire with the above-described sipes, mounted the tire to a vehicle, conducted experiments, and obtained the following results.

1) Dry road surface
   Steering stability was 6.0, and there was no change. It is believed that this is because the block rigidity did not change.
2) Icy road surface
   Steering stability was increased from 5.5 to 6.5.
3) Wet brake performance was improved by 8%.

THIRD EXAMPLE

Next, a third example will be described. In the present example, the present invention is applied to determination of the number of sipes and the length thereof. That is, instead of the sipe depth design variable set in the second example, the sipe length is used as the design variable.

Figure 25:
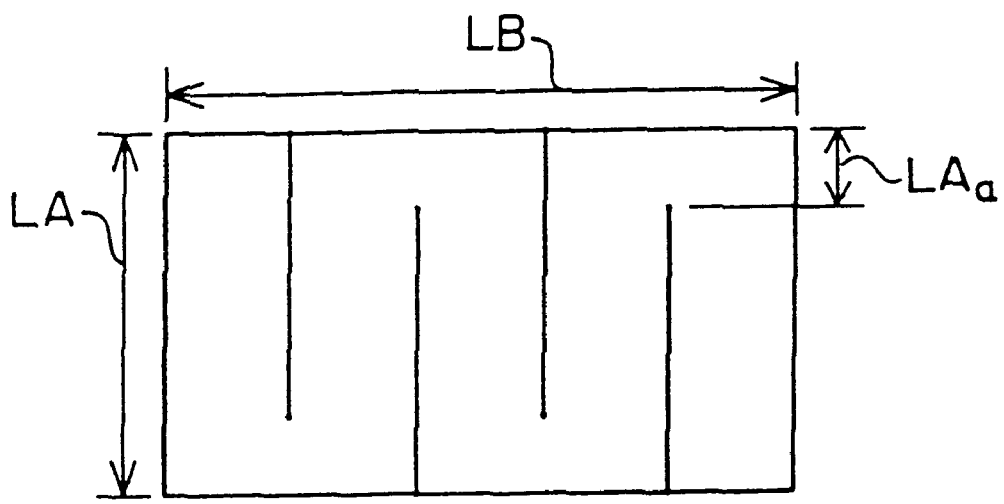
FIG. 25 is a diagram showing a block shape of a third example.

As shown in FIG. 25, one sipe is added to one block, such that the block includes four sipes. The four sipes are provided along the widthwise direction of the tire such that they extend from opposing two sides of the block alternately, and the length of each of the sipes is set such that the sipe does not reach the other side of the block. The sipe has a preform distance of length LAa. Therefore, the block having four sipes corresponds to a cantilever crank. This block is optimized as described in the above embodiment.

In the present example, the design variable is determined as follows:

Design variable: Width LAa of cantilever.

Initial value is 0 mm which corresponds to the open sipe.

The depth of the sipe is fixed at 7 mm.

As a result of optimization of the sipes by using the above design variable, the width LAa of the cantilever was 3.5 mm, and block rigidities equal to a block having three sipes could be obtained.

The present inventor actually prepared a tire with the above-described sipes, mounted the tire to a vehicle, conducted experiments, and obtained the following results. Steering stability on an icy road surface was increased from 5.5 to 6.5, and the edge length was enhanced from 80 mm to 86 mm.

EXPLANATION OF REFERENCE NUMERALS

10 keyboard
12 computer body
14 CRT

Possibility of Industrial Utilization

As described above, the method for designing a pneumatic tire according to the present invention is suitable for designing to optimize a block shape of a pneumatic tire, and is especially suitable for designing in which a groove wall surface angle and the number and shape of sipes contribute to the performance of the tire.

What is claimed is:

1. A method for designing a pneumatic tire including:
   (1) selecting one shape from among:
      a shape of a block including an internal structure,
      a pattern shape of a portion of a tire crown including an internal structure, and
      a shape of a land portion which is continuous in a tire circumferential direction including an internal structure;
   (2) determining a basic shape model on the basis of the selected one shape;
   (3) determining an objective function representing a tire performance evaluation physical amount, said objective function being related to the basic shape model;
   (4) determining a design variable for determining the basic shape model;
   (5) determining a constraint condition for restricting at least one of:
      the shape of a block including an internal structure,
      the pattern shape of a portion of a tire crown including an internal structure,
      the shape of a land portion which is continuous in a tire circumferential direction including an internal structure,
      a tire cross-sectional shape, and
      the tire performance evaluation physical amount;

(6) varying the basic shape model by varying a value of said design variable for the basic shape model;

(7) obtaining an optimal value of said design variable for the basic shape model, by which an optimal value of said objective function is obtained and which satisfies said constraint condition on the basis of a varied basic shape model and a varied value of said design variable for said basic shape model; and (8) designing the pneumatic tire on the basis of the optimal shape model.

2. A method for designing a pneumatic tire according to claim 1, wherein said step of obtaining the optimal value of said design variable comprises estimating an amount of variation of the design variable which provides the optimal value of the objective function taking into account the constraint condition and based on a sensitivity of the objective function and a sensitivity of the constraint condition, wherein the sensitivity of the objective function is a ratio of a unit amount of variation of the design variable to an amount of variation of the objective function, and the sensitivity of the constraint condition is a ratio of a unit amount of variation of the design variable to an amount of variation of the constraint condition;

calculating a value of the objective function when the design variable is varied by an amount corresponding to the estimated amount and calculating a value of the constraint condition when the design variable is varied by the amount corresponding to the estimated amount; and determining a value of the design variable which provides the optimal value of the objective function based on the estimated value and the calculated values while taking into account the constraint condition.

3. A method for designing a pneumatic tire according to claim 1, wherein said step of selecting a basic shape model comprises:

determining a selection group including a plurality of basic shape models representing a shape selected from the shape of the block including the internal structure, the shape of the pattern of a portion of a tire crown including the internal structure, and the shape of the land portion which is continuous in a tire circumferential direction including the internal structure; and determining for each basic shape model of the selection group the objective function, the design variable, the constraint condition, and an adaptive function which can be evaluated from the objective function and the constraint condition; and wherein said step of obtaining the value of the design variable comprises:

selecting two basic shape models from the selection group on the basis of the adaptive function;

creating a new basic shape model by (a) selecting design variables of the two basic shape models that cross at a predetermined probability, and/or (b) varying a portion of the design variable of at least one of the two basic shape models;

determining an objective function, a constraint condition and an adaptive function of the basic shape model whose design variable has been varied, storing the basic shape model whose design variable has been varied and a basic shape model whose design variable has not been varied, repeating the above operations until the number of stored basic shape models reaches a predetermined number, determining whether a new group including the predetermined number of the stored basic shape models satisfies a convergence condition, and repeating the above operations when the convergence condition is not satisfied, by using the new group as the selection group, until the selection group satisfies the convergence condition, and when the convergence condition is satisfied, determining a value of the design variable which provides the optimal value of the objective function from the predetermined number of the stored basic shape models while taking the constraint condition into account.

4. A method for designing a pneumatic tire according to claim 1, wherein said design variable represents at least one of:

an angle between:
a surface of the tire land portion which is formed by the shape selected from the shape of the block, the pattern shape, and the shape of the land portion, and
a surface connected to the surface of the tire land portion;

a height to the surface of the land portion;
a shape of the surface of the tire land portion;
a shape of a surface connected to the surface of the land portion;
a position of a sipe;
the number of sipes;
a width of a sipe;
a depth of a sipe;
an inclination of a sipe;
a shape of a sipe; and
a length of a sipe.

5. A method for designing a pneumatic tire according to claim 1, wherein the value of said design variable, by which an optimal value of said objective function is obtained and which satisfies said constraint condition, is obtained by varying a value of said design variable.

6. A method for designing a pneumatic tire according to claim 1, wherein the basic shape model is set in accordance with a predetermined position in the tire, and said objective function is set in accordance with the predetermined position in the tire.

7. A method for designing a pneumatic tire according to claim 6, wherein the predetermined position is a relative position along a widthwise direction of the tire.

8. A method for designing a pneumatic tire according to claim 1, wherein said objective function is related to a rigidity of the basic shape model, and is set for obtaining a uniformity of the tire in at least one of a widthwise direction of the tire and a cirucumferential direction of the tire.

9. A method for designing a pneumatic tire including the steps of:

(1) determining a basic shape model on the basis of a shape of a block including an internal structure;

(2) determining an objective function representing a tire performance evaluation physical amount, said objective function is related to the basic shape model based on the block;

(3) determining a design variable for determining the basic shape model;

(4) determining a constraint condition for restricting at least one of:
the shape of a block alone including an internal structure,
a pattern shape of a portion of a tire crown portion including an internal structure, and a shape of a land portion which is continuous in a tire circumferential direction including an internal structure;

a tire cross-sectional shape, and the tire performance evaluation physical amount;

(5) varying the basic shape model, by varying value of said design variable for the basic shape model;

(6) obtaining, on the basis of varied basic shape model and varied value of said design variable for the basic shape model, an optimal value of said design variable for the basic shape model, by which an optimal value of said objective function is obtained and which satisfies said constraint condition;

(7) obtaining an optimal basic shape model, on the basis of the optimal value of said design variable for the basic shape model;

(8) designing said pneumatic tire on the basis of the optimal basic shape model, wherein said objective function is related to rigidities of the basic shape model, and the optimal value of said objective function is obtained when the rigidities of the basic shape model in predetermined directions are substantially uniform.

10. A method for designing a pneumatic tire according to claim 9, wherein the predetermined directions include a tire circumferential direction, a tire widthwise direction and a tire oblique direction.

11. A method for designing a pneumatic tire according to claim 9, wherein the constraint condition is a tread thickness and the constraint condition is satisfied when the tread thickness is a predetermined value.

12. A method for designing a pneumatic tire including the steps of:

(1) determining a basic shape model on the basis of a shape of a block including an internal structure, a predetermine number of sipes being formed in the block;

(2) determining an objective function representing a tire performance evaluation physical amount, said objective function is related to the basic shape model based on the block;

(3) determining a design variable for determining the basic shape model;

(4) determining a constraint condition for restricting at least one of:

the shape of a block alone including an internal structure, a pattern shape of a portion of a tire crown portion including an internal structure, and a shape of a land portion which is continuous in a tire circumferential direction including an internal structure;

a tire cross-sectional shape, and the tire performance evaluation physical amount;

(5) varying the basic shape model, by varying value of said design variable for the basic shape model;

(6) obtaining an optimal value of said design variable for the basic shape model on the basis of varied basic shape model and varied value of said design variable for the basic shape model, by which an optimal value of said objective function is obtained and which satisfies said constraint condition;

(7) obtaining an optimal basic shape model, on the basis of the optimal value of said design variable for the basic shape model;

(8) designing said pneumatic tire on the basis of the optimal basic shape model, wherein said objective function is related to a rigidity of the basic shape model, and the optimal value of said objective function is obtained when the difference between (a) the rigidity of the basic shape model, having the predetermined number of sipes, in a predetermined direction and (b) a rigidity of a basic shape model, having a number of sipes which number is different from the predetermined number, in the predetermined direction becomes a predetermined value.

13. A method for designing a pneumatic tire according to claim 12, wherein the optimal value of said objective function is obtained when said difference becomes a minimum value.

14. A method for designing a pneumatic tire according to claim 12, wherein said design variable is a depth of sipe.

* * * * *

UNITED STATES PATENT AND TRADEMARK OFFICE
CERTIFICATE OF CORRECTION

PATENT NO.    : 6,230,112 B1                                       Page 1 of 1
DATED         : May 8, 2001
INVENTOR(S)   : Makoto Ishiyama It is certified that error appears in the above-identified patent and that said Letters Patent is hereby corrected as shown below:

Title page,
Under "Foreign Application Priority Date" delete "8-350720" and insert
-- 8-350719 --.

Signed and Sealed this

Twenty-second Day of January, 2002

Attest:

Attesting Officer

JAMES E. ROGAN
*Director of the United States Patent and Trademark Office*